United States Patent
Zhang et al.

(10) Patent No.: US 10,200,904 B2
(45) Date of Patent: Feb. 5, 2019

(54) TECHNIQUES FOR TRANSMITTING ON MULTIPLE CARRIERS OF A SHARED RADIO FREQUENCY SPECTRUM BAND

(71) Applicant: QUALCOMM Incorporated, San Diego, CA (US)

(72) Inventors: Xiaoxia Zhang, San Diego, CA (US); Siddhartha Mallik, San Diego, CA (US); Srinivas Yerramalli, San Diego, CA (US); Taesang Yoo, Riverside, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 15/157,612

(22) Filed: May 18, 2016

(65) Prior Publication Data
US 2016/0381589 A1   Dec. 29, 2016

Related U.S. Application Data

(60) Provisional application No. 62/184,217, filed on Jun. 24, 2015.

(51) Int. Cl.
*H04W 24/10*  (2009.01)
*H04L 5/00*   (2006.01)
(Continued)

(52) U.S. Cl.
CPC ............. *H04W 24/10* (2013.01); *H04L 5/001* (2013.01); *H04L 5/0048* (2013.01);
(Continued)

(58) Field of Classification Search
CPC ..... H04L 27/0006; H04L 41/08; H04L 5/001; H04L 5/0048; H04L 5/0053; H04W 24/08; H04W 24/10; H04W 72/085
See application file for complete search history.

(56) References Cited

U.S. PATENT DOCUMENTS

| | | | |
|---|---|---|---|
| 2009/0041151 A1* | 2/2009 | Khan | H04L 5/0023 375/267 |
| 2011/0044247 A1* | 2/2011 | Luo | H04W 52/146 370/328 |

(Continued)

OTHER PUBLICATIONS

ISA/EP, International Search Report and Written Opinion of the International Searching Authority, Int'l App. No. PCT/US2016/033332, dated Aug. 26, 2016, European Patent Office, Rijswijk, NL, 12 pgs.

(Continued)

*Primary Examiner* — Kan Yuen
(74) *Attorney, Agent, or Firm* — Nerrie M. Zohn

(57) ABSTRACT

Measurement and demodulation may be impacted by varying transmit power due to varying numbers of carriers in a shared radio frequency (RF) spectrum band. Methods, systems, and devices are described for wireless communication. One method includes monitoring at least one carrier of a RF spectrum band for a first reference signal transmitted in a number of listen-before-talk (LBT) radio frames from a plurality of LBT radio frames associated with the plurality of carriers, where the plurality of LBT radio frames are received at the user equipment (UE) in different sets of at least one carrier of the RF spectrum band at different times, and where the first reference signal is associated with a first fixed transmit power; receiving a plurality of instances of the first reference signal; measuring the plurality of instances; and determining a cell measurement based at least in part on the measurements of the plurality of instances.

32 Claims, 13 Drawing Sheets

(51) Int. Cl.
  *H04L 27/00* (2006.01)
  *H04L 12/24* (2006.01)
  *H04W 24/08* (2009.01)
  *H04W 72/08* (2009.01)

(52) U.S. Cl.
  CPC ........ *H04L 5/0053* (2013.01); *H04L 27/0006* (2013.01); *H04L 41/08* (2013.01); *H04W 24/08* (2013.01); *H04W 72/085* (2013.01)

(56) References Cited

U.S. PATENT DOCUMENTS

2017/0347270 A1* 11/2017 Iouchi .................. H04W 16/14
2017/0367092 A1* 12/2017 Kim ................. H04W 72/0446

OTHER PUBLICATIONS

ITRI, "DRS Design for LAA," 3GPP TSG RAN WG1 Meeting #81, R1-152941, Fukuoka, Japan, May 25-29, 2015, 4 pgs., XP_50971826A, 3rd Generation Partnership Project.
Qualcomm Incorporated, "Multi-carrier LBT Operation for LAA," 3GPP TSG RAN WG1 #81, R1-152784, Fukuoka, Japan, May 25-29, 2015, 6 pgs., XP_50973227A, 3rd Generation Partnership Project.
Qualcomm Incorporated, "Multi-carrier Operation for LAA," 3GPP TSG RAN WG1 #81, R1-152785, Fukuoka, Japan, May 25-29, 2015, 5 pgs., XP_50973236A, 3rd Generation Partnership Project.
Samsung, "Further Discussion on Data Power Setting for PDSCH," 3GPP TSG-RAN WG1 #52bis, R1-081230, Shenzhen, China, Mar. 31-Apr. 4, 2008, 6 pgs., XP_50109674A, rd Generation Partnership Project.

* cited by examiner

TECHNIQUES FOR TRANSMITTING ON MULTIPLE CARRIERS OF A SHARED RADIO FREQUENCY SPECTRUM BAND

CROSS REFERENCES

The present application for patent claims priority to U.S. Provisional Patent Application No. 62/184,217 by Zhang et al., entitled "Techniques for Transmitting on Multiple Carriers of a Shared Radio Frequency Spectrum Band," filed Jun. 24, 2015, assigned to the assignee hereof.

BACKGROUND

Field of the Disclosure

The present disclosure, for example, relates to wireless communication systems, and more particularly to techniques for transmitting on multiple carriers of a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink carriers (e.g., for transmissions from a base station to a UE) and uplink carriers (e.g., for transmissions from a UE to a base station).

Some modes of communication may allow communication between a base station and a UE over a shared radio frequency spectrum band, or over different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, offloading of at least some data traffic to a shared (e.g., unlicensed) radio frequency spectrum band may provide a cellular operator with opportunities for enhanced data transmission capacity. A shared radio frequency spectrum band may also provide service in areas where access to a dedicated radio frequency spectrum band is unavailable.

Prior to gaining access to and communicating over a shared radio frequency spectrum band, a base station or UE may perform a listen-before-talk (LBT) procedure to contend for access to one or more carriers of the shared radio frequency spectrum band. When a base station or UE contends for access to multiple carriers of the shared radio frequency spectrum band in parallel, access to some carriers may be won while access to other carriers may be lost. When there are power limitations across one or more subbands of the shared radio frequency spectrum band, and the set of carriers over which the base station or UE transmits varies from one radio frame to another, measurement and demodulation at a receiver can be impacted by the transmitter's use of varying transmit powers, per carrier, from one radio frame to another.

SUMMARY

Power limitations may exist for a transmitter operating in a shared radio frequency spectrum band, and access to carriers of the shared radio frequency band may be contention-based. Due to the power limitations and the varying number of carriers available for transmission, different transmissions may have varying transmit power levels, making demodulation of the transmissions by a receiver difficult. In order to provide more accurate channel state feedback and for more efficient traffic demodulation, a receiver may determine the transmit power levels of reference signals transmitted by a transmitter based on the number of carriers that the transmitter uses for transmission. A transmitter may scale transmission power for reference signals according to the number of carriers used for transmission. The receiver may detect the number of carriers used for transmission based on the relative power levels of the scaled reference signals to a pre-configured transmit power level. Alternatively, the transmitter may indicate the number of carriers used for transmission.

A receiver may determine carrier-dependent transmit power levels of reference signals for use in traffic demodulation and for determining channel state feedback reports. By comparing received power levels of non-power scaled reference signals (e.g., DRS) with received power levels of power-scaled reference signals that are dependent on the number of carriers used for transmission, a receiver may determine the number of carriers used for transmission of the power-scaled reference signals. Alternatively, the receiver may receive from the transmitter an indicator of the number of carriers in a transmission carrying the power-scaled reference signals. Based on the number of carriers used for transmission, the receiver may determine the transmit power levels of the second reference signals. Additionally, based on the determined transmit power levels of the power-scaled reference signals, the receiver may demodulate traffic as well as generate channel state feedback for transmission to the transmitter.

Additionally, a receiver may determine a radio resource management (RRM) configuration by measuring the non-power scaled reference signals, where the RRM configuration may indicate the transmit power levels of the non-power scaled reference signals. Based on the number of carriers used for transmission, the received power levels of the non-power scaled reference signals, and the RRM configuration, the receiver may determine the transmit power levels of the power-scaled reference signals.

A transmitter may configure reference signals for a receiver to determine the transmitted power levels of the reference signals. The transmitter may transmit a set of first reference signals (e.g., DRS) at power levels that are independent of power level restrictions. The transmitter may also transmit second reference signals (e.g., CSI-RS, CRS) in a data transmission at power levels that are dependent on the number of carriers used for transmission. These respective transmit power levels may allow a receiver to determine the number of carriers used for the second reference signals, and subsequently, the transmit power levels for the second reference signals.

Systems, methods, and apparatuses for communications over multiple carriers of a shared radio frequency spectrum band are described. In accordance with aspects of the present disclosure, a UE may monitor a carrier of a plurality of carriers of a radio frequency spectrum band according to a discovery reference signals (DRS) configuration for first reference signals transmitted over one or more of the plurality of carriers. The first reference signals may be received at the UE in different sets of carriers of the RF spectrum band at different times, and may be associated with respective first transmit power levels that are preconfigured for the plurality of carriers. The UE may receive a set of instances of the first reference signal, and may measure the set of instances. The UE may then perform a cell measurement based on the measurements of the set of instances of the first reference signal. The UE may also receive a transmission including second reference signals over a first set of carriers of the plurality of carriers, and identify respective second transmit power levels for the first set of carriers, wherein the respective second transmit power levels are dependent on the number of transmitted carriers of the transmission.

A method of wireless communication is described. The method may include monitoring a plurality of carriers of a radio frequency (RF) spectrum band according to a discovery reference signals (DRS) configuration, wherein transmissions over the plurality of carriers are subject to a listen-before-talk (LBT) procedure, and determining a network reporting measurement based at least in part on measurements of first reference signals transmitted over one or more of the plurality of carriers according to the DRS configuration, wherein the first reference signals are associated with respective first transmit power levels that are preconfigured for the plurality of carriers. The method may also include receiving a transmission over a first set of carriers of the plurality of carriers, the transmission including second reference signals, and identifying respective second transmit power levels of the second reference signals for the first set of carriers, wherein the respective second transmit power levels are dependent on the number of transmitted carriers of the transmission.

An apparatus for wireless communication is described. The apparatus may include means for monitoring a plurality of carriers of a radio frequency (RF) spectrum band according to a discovery reference signals (DRS) configuration, wherein transmissions over the plurality of carriers are subject to a listen-before-talk (LBT) procedure, and means for determining a network reporting measurement based at least in part on measurements of first reference signals transmitted over one or more of the plurality of carriers according to the DRS configuration, wherein the first reference signals are associated with respective first transmit power levels that are preconfigured for the plurality of carriers. The apparatus may also include means for receiving a transmission over a first set of carriers of the plurality of carriers, the transmission including second reference signals, and means for identifying respective second transmit power levels of the second reference signals for the first set of carriers, wherein the respective second transmit power levels are dependent on the number of transmitted carriers of the transmission.

A further apparatus for wireless communication is described. The apparatus may include a processor, memory in electronic communication with the processor, and instructions stored in the memory. The instructions may be operable, when executed by the processor, to cause the apparatus to monitor a plurality of carriers of a radio frequency (RF) spectrum band according to a discovery reference signals (DRS) configuration, wherein transmissions over the plurality of carriers are subject to a listen-before-talk (LBT) procedure, and to determine a network reporting measurement based at least in part on measurements of first reference signals transmitted over one or more of the plurality of carriers according to the DRS configuration, wherein the first reference signals are associated with respective first transmit power levels that are preconfigured for the plurality of carriers. The instructions may also be operable, when executed by the processor, to cause the apparatus to receive a transmission over a first set of carriers of the plurality of carriers, the transmission including second reference signals, and to identify respective second transmit power levels of the second reference signals for the first set of carriers, wherein the respective second transmit power levels are dependent on the number of transmitted carriers of the transmission.

A non-transitory computer-readable medium storing code for wireless communication is described. The code may include instructions executable to monitor a plurality of carriers of a radio frequency (RF) spectrum band according to a discovery reference signals (DRS) configuration, wherein transmissions over the plurality of carriers are subject to a listen-before-talk (LBT) procedure, and to determine a network reporting measurement based at least in part on measurements of first reference signals transmitted over one or more of the plurality of carriers according to the DRS configuration, wherein the first reference signals are associated with respective first transmit power levels that are preconfigured for the plurality of carriers. The code may also include instructions executable to receive a transmission over a first set of carriers of the plurality of carriers, the transmission including second reference signals, and to identify respective second transmit power levels of the second reference signals for the first set of carriers, wherein the respective second transmit power levels are dependent on the number of transmitted carriers of the transmission.

Some examples of the method, apparatuses, or non-transitory computer-readable medium described herein may further include receiving at least one traffic-to-pilot ratio (TPR) indicator associated with the transmission, and demodulating the transmission based at least in part on the respective second transmit power levels, measured power levels of the second reference signals, and the at least one TPR indicator. Additionally or alternatively, the identifying the respective second transmit power levels may include detecting the respective second transmit power levels based at least in part on the measured power levels of the second reference signals. Additionally or alternatively, the identifying the respective second transmit power levels may include receiving at least one indicator of the respective second transmit power levels.

Some examples of the method, apparatuses, or non-transitory computer-readable medium described herein may further include processes, features, means, or instructions for determining a channel feedback measurement for at least one carrier of the first set of carriers based at least in part on a number of carriers in the first set of carriers. The determining the channel feedback measurement may include combining channel measurements across a plurality of transmissions for the at least one carrier based at least in part on the identified respective second transmit power levels. Additionally or alternatively, some examples of the method, apparatuses, or non-transitory computer-readable medium described herein may further include processes, features, means, or instructions for transmitting, to a base station, a channel state information (CSI) feedback message indicating a power spectral density measurement. Additionally or alternatively, the respective transmit power levels may include values of a set of preconfigured values relative to the respective first transmit power levels.

A further method of wireless communication is described. The method may include transmitting first reference signals over a plurality of carriers according to a discovery reference signals (DRS) configuration, wherein transmissions over the plurality of carriers are subject to a listen-before-talk (LBT) procedure, and wherein the DRS configuration comprises respective first transmit power levels that are preconfigured for the plurality of carriers and associated with the first reference signals, and transmitting a data signal transmission over a first set of carriers of the plurality of carriers, wherein the data signal transmission comprises second reference signals, and wherein the respective second transmit power levels are dependent on a number of carriers in the data signal transmission.

An apparatus for wireless communication is described. The apparatus may include means for transmitting first reference signals over a plurality of carriers according to a discovery reference signals (DRS) configuration, wherein transmissions over the plurality of carriers are subject to a listen-before-talk (LBT) procedure, and wherein the DRS configuration comprises respective first transmit power levels that are preconfigured for the plurality of carriers and associated with the first reference signals, and means for transmitting a data signal transmission over a first set of carriers of the plurality of carriers, wherein the data signal transmission comprises second reference signals, and wherein the respective second transmit power levels are dependent on a number of carriers in the data signal transmission.

A further apparatus for wireless communication is described. The apparatus may include a processor, memory in electronic communication with the processor, and instructions stored in the memory. The instructions may be operable, when executed by the processor, to cause the apparatus to transmit first reference signals over a plurality of carriers according to a discovery reference signals (DRS) configuration, wherein transmissions over the plurality of carriers are subject to a listen-before-talk (LBT) procedure, and wherein the DRS configuration comprises respective first transmit power levels that are preconfigured for the plurality of carriers and associated with the first reference signals, and to transmit a data signal transmission over a first set of carriers of the plurality of carriers, wherein the data signal transmission comprises second reference signals, and wherein the respective second transmit power levels are dependent on a number of carriers in the data signal transmission.

A non-transitory computer-readable medium storing code for wireless communication is described. The code may include instructions executable to transmit first reference signals over a plurality of carriers according to a discovery reference signals (DRS) configuration, wherein transmissions over the plurality of carriers are subject to a listen-before-talk (LBT) procedure, and wherein the DRS configuration comprises respective first transmit power levels that are preconfigured for the plurality of carriers and associated with the first reference signals, and to transmit a data signal transmission over a first set of carriers of the plurality of carriers, wherein the data signal transmission comprises second reference signals, and wherein the respective second transmit power levels are dependent on a number of carriers in the data signal transmission.

Some examples of the method, apparatuses, or non-transitory computer-readable medium described herein may further include processes, features, means, or instructions for configuring at least one reference traffic-to-pilot ratio (TPR) indicator for the data signal transmission, and transmitting the at least one reference TPR indicator to UEs served by the first set of carriers. Additionally or alternatively, some examples of the method, apparatuses, or non-transitory computer-readable medium described herein may further include processes, features, means, or instructions for transmitting an indication of the respective second transmit power levels to UEs served by the first set of carriers. Additionally or alternatively, the respective second transmit power levels may be based at least in part on a set of preconfigured values relative to the respective first transmit power levels. Additionally or alternatively, some examples of the method, apparatuses, or non-transitory computer-readable medium described herein may further include processes, features, means, or instructions for receiving channel feedback reporting from a user equipment (UE), and for determining a modulation and coding scheme (MCS) for the data signal transmission based at least in part on the received channel feedback reporting and the number of carriers in the data signal transmission.

BRIEF DESCRIPTION OF THE DRAWINGS

Aspects of the disclosure are described in reference to the following figures.

DETAILED DESCRIPTION

Figure 1:
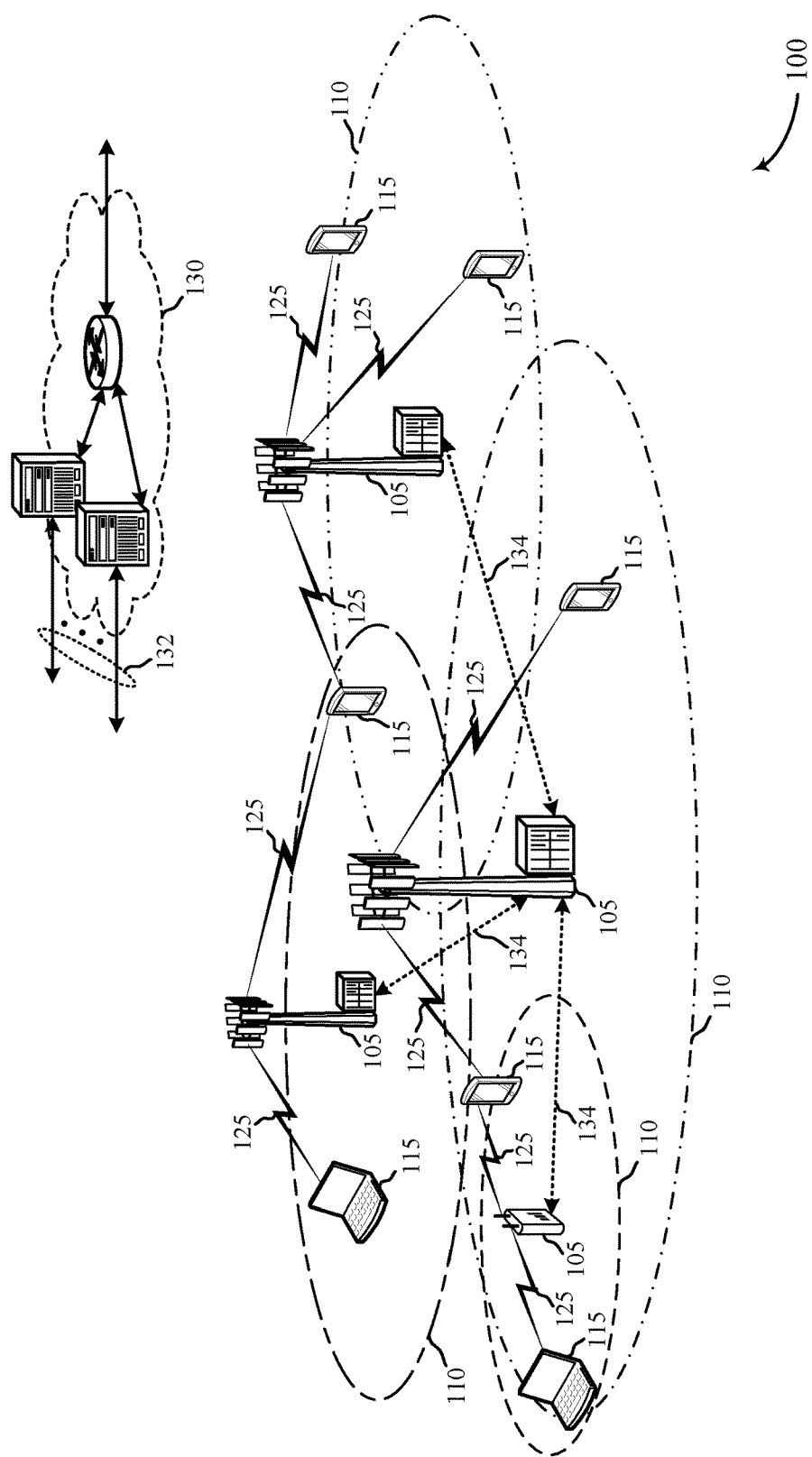
FIG. 1 illustrates an example of a wireless communication system, in accordance with various aspects of the disclosure.

Techniques are described in which a shared radio frequency spectrum band is used for at least a portion of communications over a wireless communication system. In some examples, the shared radio frequency spectrum band may be used for communications based on Long Term Evolution (LTE) or LTE-Advanced (LTE-A) protocols. The shared radio frequency spectrum band may be used in combination with, or independent from, a dedicated radio frequency spectrum band. A dedicated radio frequency spectrum band may be a radio frequency spectrum band licensed to a network operator (e.g., mobile network operator (MNO), etc.), such as a licensed radio frequency spectrum band used for LTE/LTE-A communications. Communications over the dedicated radio frequency spectrum band may be scheduled by base stations of the network operator and therefore not contention-based. The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. Before gaining access to and communicating over a shared radio frequency spectrum band, a transmitting apparatus may perform a listen-before-talk (LBT) procedure to gain access to the medium. Such an LBT procedure may include performing a clear channel assessment (CCA procedure) (or extended CCA procedure) to determine whether a carrier of the shared radio frequency spectrum band is available. When it is determined that the carrier of the shared radio frequency spectrum band is available, a channel usage beacon signal (CUBS) may be broadcast to reserve the carrier. In the case of a base station, indications of the downlink subframes and uplink subframes for which the carrier is being reserved may also be broadcast. When it is determined that the carrier is not available, a CCA procedure (or extended CCA procedure) may be performed for the carrier again at a later time. In some cases, a base station or UE may attempt to gain access to multiple carriers of a shared radio frequency spectrum band.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to physical carriers.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

A base station 105 may insert periodic pilot symbols such as cell-specific reference signals (CRS) to aid UEs 115 in carrier estimation and coherent demodulation. CRS may be dependent on cell identity, of which there may be 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, demodulation reference signal (DM-RS) (which may also be called UE-specific reference signals (UE-RS)) may be directed toward specific UEs 115 and may be transmitted only on resource blocks assigned to those UEs 115. DM-RS may include signals on 6 resource elements in each resource block in which they are transmitted. The DM-RS for different antenna ports may each utilize the same 6 resource elements, and may be distinguished using different orthogonal cover codes (e.g., masking each signal with a different combination of 1 or −1 in different resource elements). In some cases, two sets of DM-RS may be transmitted in adjoining resource elements. In some cases, additional reference signals known as channel state information (CSI) reference signals (CSI-RS) may be included to aid in channel feedback reporting. On the UL, a UE 115 may transmit a combination of periodic sounding reference signal (SRS) and uplink (UL) DM-RS for link adaptation and demodulation, respectively.

A base station 105 may gather CSI information for a carrier from a UE 115 in order to efficiently configure and schedule the carrier. This information may be sent from the UE 115 in the form of a CSI report. A CSI report may contain a rank indicator (RI) requesting a number of layers to be used for downlink (DL) transmissions (e.g., based on the antenna ports of the UE 115), a precoding matrix indicator (PMI) indicating a preference for which precoder matrix should be used (based on the number of layers), and a channel quality indicator (CQI) representing the highest modulation and coding scheme (MCS) that may be used. CQI may be calculated by a UE 115 after receiving predetermined pilot symbols such as CRS or CSI-RS. RI and PMI may be excluded if the UE 115 does not support spatial multiplexing (or is not configured in a transmission mode that supports spatial multiplexing). The types of information included in the report determines a reporting type. CSI reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

In some examples, the wireless communication system 100 may support operation over one or more dedicated radio frequency spectrum bands and one or more shared radio frequency spectrum bands. In some examples, a transmitter (e.g., a base station 105 or UE 115) of the wireless communication system 100 may determine to transmit over multiple carriers of a shared radio frequency spectrum band. Because the transmitter may need to separately contend for access to different carriers of the shared radio frequency spectrum band, the set of carriers over which the transmitter can transmit may vary from one transmission opportunity to another. When the transmitter is configured to operate at or near a maximum allowed transmit power and PSD, the varying number of carriers over which the transmitter may transmit can impose challenges on measurement and demodulation operations of an intended receiver. Thus, in accordance with the present disclosure, a UE 115 may monitor a carrier of a set of carriers of a radio frequency spectrum band for a first reference signal transmitted in a plurality of carriers of a radio frequency spectrum band according to a discovery reference signals (DRS) configuration, where transmissions over the plurality of carriers are subject to a LBT procedure. The transmissions may be received at the UE in different sets of carriers of the RF spectrum band at different times, and the first reference signals may be associated with respective first transmit power levels. The UE may receive a set of instances of the first reference signal, and may measure the set of instances. The UE may then determine a network reporting measurement based on the measurements of the set of instances of the first reference signal.

Figure 2:
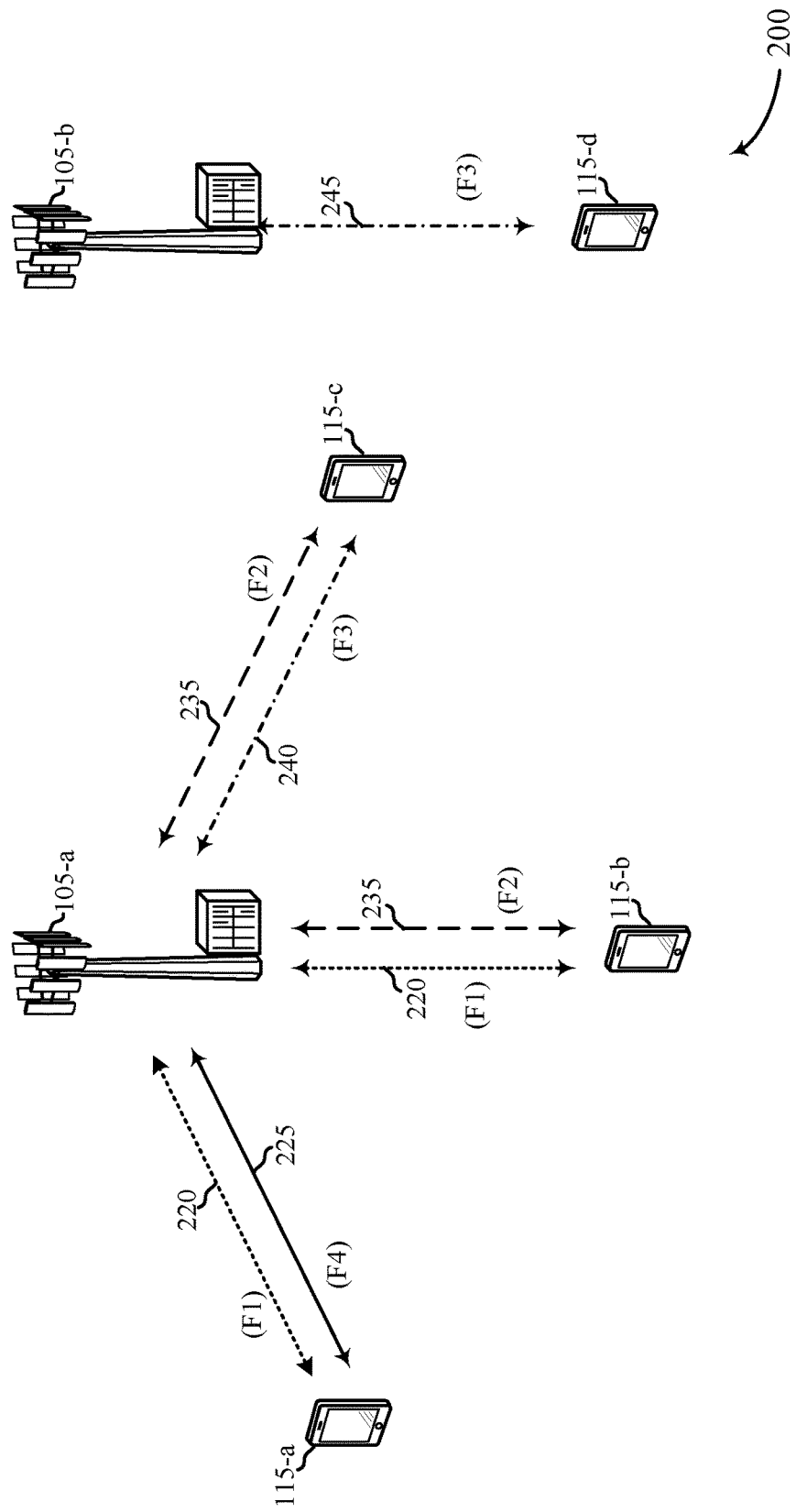
FIG. 2 shows a wireless communication system in which LTE/LTE-A may be deployed under different scenarios using a dedicated radio frequency spectrum band or a shared radio frequency spectrum band, in accordance with various aspects of the present disclosure.

FIG. 2 shows a wireless communication system 200 in which LTE/LTE-A may be deployed under different scenarios using a shared frequency spectrum band, in accordance with various aspects of the present disclosure. More specifically, FIG. 2 illustrates examples of carrier aggregation (CA) including a supplemental downlink mode (also referred to as a licensed assisted access (LAA) mode) and a standalone (SA) mode in which LTE/LTE-A based signaling is deployed using a shared frequency spectrum band. The wireless communication system 200 may be an example of portions of the wireless communication system 100 described with reference to FIG. 1. Moreover, a first base station 105-a and a second base station 105-b may be examples of aspects of one or more of the base stations 105 described with reference to FIG. 1, while a first UE 115-a, a second UE 115-b, a third UE 115-c, and a fourth UE 115-d may be examples of aspects of one or more of the UEs 115 described with reference to FIG. 1.

In the example of a supplemental downlink mode (e.g., a licensed assisted access mode) in the wireless communication system 200, the first base station 105-a may communicate with a first UE 115-a over carrier(s) 225, which may be associated with a frequency F4 (or multiple frequencies) in a dedicated frequency spectrum band. Carrier(s) 225 may be a primary component carrier (PCC) for the UE 115-a and may carry data and control information for downlink and uplink transmissions over carrier(s) 225 as well as some control information associated with other carriers. The first UE 115-a may be configured in a CA mode to communicate over carrier 220 concurrently with communication over carrier(s) 225 (e.g., configured as a secondary component carrier (SCC) for UE 115-a). Carrier 220 may be associated with a frequency F1 in a shared frequency spectrum band. Carrier 220 may provide a capacity offload for the first base station 105-a. In some examples, the carrier 220 may be used for unicast services (e.g., addressed to one UE) or for multicast services (e.g., addressed to several UEs). This scenario may occur with any service provider (e.g., MNO) that has deployed capacity in a dedicated frequency spectrum with the capability of off-loading to the shared frequency spectrum band.

UEs 115-b and 115-c may be configured by base station 105-a to operate in SA mode using one or more of carriers 220, 235, and 240, which may be associated with frequencies F1, F2, and F3 in a shared frequency spectrum band. UE 115-d may be configured by base station 105-b to operate in SA mode using carrier 245, which may be associated with frequency F3. Like the supplemental downlink mode described above, SA mode may be used by any service provider (e.g., MNO) that has deployed capacity in a dedicated frequency spectrum with the capability of off-loading to the shared frequency spectrum band. SA mode may also be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated frequency spectrum band.

Base stations 105-a and 105-b may communicate with UEs 115-a, 115-b, 115-c, and 115-d over carriers 220, 235, 240, and/or 245 using LTE/LTE-A based waveforms. The LTE/LTE-A based waveforms may be transmitted using enhanced component carrier (eCC) channel structures as discussed in FIGS. 3A-3C. These examples are presented for illustrative purposes and there may be other similar modes of operation or deployment scenarios that combine LTE/LTE-A in a dedicated frequency spectrum band and use a shared frequency spectrum band for capacity offload.

In some examples, a transmitter such as one of the base stations 105 described with reference to FIG. 1 or 2, or one of the UEs 115 described with reference to FIG. 1 or 2, may use a gating interval to gain access to a carrier of a shared frequency spectrum band (e.g., to a physical carrier of the shared frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified by the European Telecommunications Standards Institute (ETSI). When using a gating interval that defines the application of an LBT protocol, the gating interval may indicate when a transmitting apparatus needs to perform a contention procedure (e.g., an LBT procedure) such as a CCA procedure. The outcome of the CCA procedure may indicate to the transmitting apparatus whether a carrier of a shared frequency spectrum band is available or in use for the gating interval (also referred to as an LBT radio frame). When a CCA procedure indicates that the carrier is available for a corresponding LBT radio frame (e.g., clear for use), the transmitting apparatus may reserve or use the carrier of the shared frequency spectrum band during part or all of the LBT radio frame. When the CCA procedure indicates that the carrier is not available (e.g., that the carrier is in use or reserved by another transmitting apparatus), the transmitting apparatus may be prevented from using the carrier during the LBT radio frame.

Figure 3A:
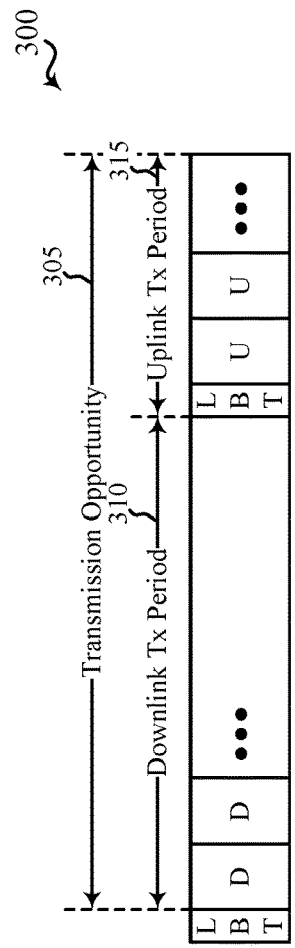
FIG. 3A-3C shows an example of a wireless communication over a shared radio frequency spectrum band, in accordance with various aspects of the present disclosure.

FIG. 3A shows a timeline 300 of communications in an uplink, in accordance with various aspects of the present disclosure. The timeline 300 shows a transmission opportunity 305 including a downlink transmission (Tx) period 310 followed by an uplink transmission (Tx) period 315. In some examples, the downlink transmission period 310 may be subdivided into a plurality of downlink TTIs (e.g., downlink (D) subframes), and the uplink transmission period 315 may be subdivided into a plurality of uplink TTIs (e.g., uplink (U) subframes).

In some examples, one or more of the downlink TTIs in the downlink transmission period 310 may carry uplink grants for one or more uplink TTIs in the uplink transmission period 315 (e.g., for same-carrier scheduling, or self-scheduling of uplink transmissions). In other examples, one or more uplink grants for one or more uplink TTIs in the uplink transmission period 315 may be transmitted on a different CC than the CC shown in FIG. 3A (e.g., for cross-carrier scheduling).

When multiple TTIs are scheduled for the uplink transmission period 315, DCI (e.g., a DCI Format 0) for the multiple TTIs may include parameters such as: resource block (RB) allocation, modulation and coding scheme (MCS) and redundancy value (RV), new data indicator (NDI), transmit power control (TPC) command, cell-specific demodulation reference signal (CS-DMRS), uplink (UL) index, downlink assignment index (DAI), channel state information (CSI) request, sounding reference signal (SRS) request, resource allocation type, or a combination thereof. In LTE/LTE-A networks, TDD Format 0 allows two separate uplink grants to be carried to a single UE in a downlink TTI in a dedicated radio frequency spectrum band. The application of each uplink grant may be determined by an UL index associated with the uplink grant, and may influence power control, aperiodic CSI reporting, and PUSCH transmission. Similar functionality may be provided for an uplink grant applicable to an uplink transmission in a shared radio frequency spectrum band.

Assuming no cross-transmission opportunity scheduling or cross-carrier scheduling, multiple uplink grants for a multiple-TTI uplink transmission in a shared radio frequency spectrum band during the uplink transmission period 315 (which may be carried within a single downlink TTI of the downlink transmission period 310) may each include DCI fields such as: a UL index field, a HARQ index field, a reference signal and PUSCH multiplexing indicator field (e.g., a SRS/PUSCH multiplexing indicator field), a resource reuse indicator field (e.g., a PUCCH/PRACH resource reuse indicator field), LBT parameters, or a combination thereof. A UL index may indicate to a UE which uplink TTI (e.g., uplink subframe) in the transmission opportunity 305 (also referred to as a current transmission burst) carries a PUSCH transmission. The UL index may be referenced to an end of the downlink TTI carrying the uplink grant that includes the UL index. LBT parameters may indicate to a UE whether to puncture a first symbol of an uplink TTI to perform a shortened LBT procedure (e.g., a 25 μs LBT procedure), or whether to perform a full-length LBT procedure (e.g., a category (CAT) 4 LBT procedure). When indicating to perform a CAT 4 LBT procedure, the LBT parameters may indicate one or more of a LBT priority class or a contention window size. In some examples, the loss of contention to access a shared radio frequency spectrum band during a TTI of a multi-TTI uplink transmission (e.g., by a UE performing a CAT 4 LBT procedure) may cause the UE to carryover the CAT 4 LBT procedure parameters to a next TTI of the multi-TTI uplink transmission.

Figure 3B:
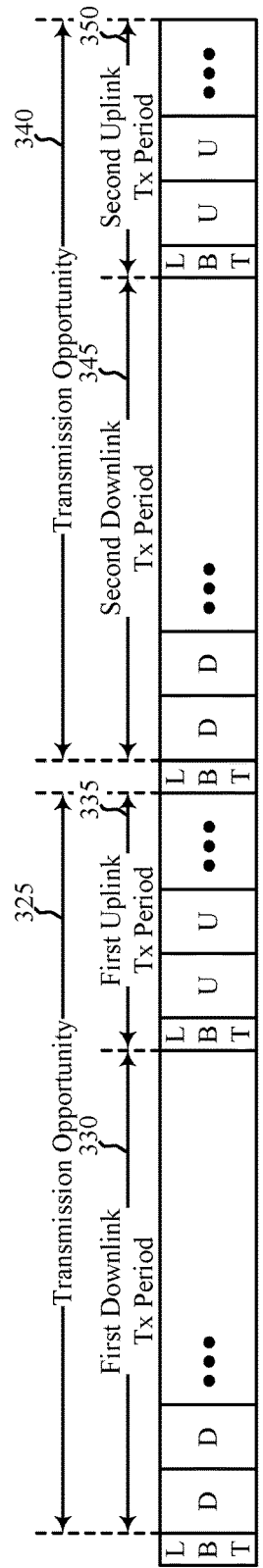

FIG. 3B shows a timeline 320 of communications in an uplink, in accordance with various aspects of the present disclosure. The timeline 320 shows a first transmission opportunity 325 followed by a second transmission opportunity 340. The first transmission opportunity 325 may include a first downlink Tx period 330 followed by a first uplink Tx period 335. The second transmission opportunity 340 may include a second downlink transmission (Tx) period 345 followed by a second uplink Tx period 350. In some examples, one or both of the downlink transmission periods (e.g., the first downlink transmission period 330 or the second downlink transmission period 345) may be subdivided into a plurality of downlink TTIs (e.g., D subframes), and one or both of the uplink transmission periods (e.g., the first uplink transmission period 335 or the second uplink transmission period 350) may be subdivided into a plurality of uplink TTIs (e.g., U subframes).

In some examples, one or more of the downlink TTIs in the first downlink Tx period 330 may carry uplink grants for one or more uplink TTIs in the second uplink Tx period 335 (e.g., cross-transmission opportunity scheduling of uplink transmissions).

Assuming cross-transmission opportunity scheduling is used to schedule uplink transmissions in the second uplink transmission period 350, and assuming that the second downlink transmission period 345 precedes the second uplink transmission period 350, multiple uplink grants for a multiple-TTI uplink transmission in a shared radio frequency spectrum band during the second uplink transmission period 350 (which may be carried within a downlink TTI of the first downlink Tx period 330) may each include DCI fields such as: a UL index field, a HARQ index field, a reference signal and PUSCH multiplexing indicator field (e.g., a SRS/PUSCH multiplexing indicator field), a resource reuse indicator field (e.g., a PUCCH/PRACH resource reuse indicator field), LBT parameters, or a combination thereof. In addition, each uplink grant may include DCI fields such as: a current transmission burst index field, a target transmission burst index field, or a PUSCH transmission skipping strategy field. A current transmission burst index may indicate to a UE a first transmission burst (e.g., the first transmission opportunity 325) in which an uplink grant is received, and a target transmission burst index may indicate to the UE a second transmission burst (e.g., the second transmission opportunity 340) to which the uplink grant applies. In some examples, a base station may broadcast the current transmission burst index to a plurality of UEs, in DCI on a common PDCCH. A UL index may identify an uplink TTI of the second transmission burst (e.g., the second transmission opportunity 340) in which a PUSCH transmission begins. A PUSCH transmission skipping strategy may indicate, to a UE, whether to skip at least a temporally first PUSCH transmission, or at least a temporally last PUSCH transmission, when a LBT procedure for at least a first TTI of a multiple-TTI transmission is not successful.

In some examples, a UE that receives at least one uplink grant for at least one TTI of a multiple-TTI uplink transmission in a shared radio frequency spectrum band may perform a LBT procedure to contend for access to the shared radio frequency spectrum band for a TTI of the multiple-TTI uplink transmission. Upon losing contention for access to the shared radio frequency spectrum band for the TTI, the UE may trigger an uplink transmission carryover strategy. The uplink transmission carryover strategy may indicate to the UE to carryover or not carryover, to a next TTI of the multiple-TTI uplink transmission, a parameter associated with the TTI for which contention for access to the shared radio frequency spectrum band is lost. In some examples, the parameter may include a CSI transmission parameter, or a SRS transmission parameter, or a TPC command, or a combination thereof. In some examples, a carried over TPC command may be applied cumulatively to a TTI.

In some examples, a UE that receives at least one uplink grant for at least one TTI of a multiple-TTI uplink transmission in a shared radio frequency spectrum band may perform a LBT procedure to contend for access to the shared radio frequency spectrum band for a TTI of the multiple-TTI uplink transmission. Upon winning contention for access to the shared radio frequency spectrum band for the TTI, the UE may transmit data associated with a LBT priority class (e.g., best effort data, video data, etc.) indicated in an uplink grant for the TTI. Upon running out of data associated with the LBT priority class, the UE may or may not transmit data for the remainder of the TTI.

In some examples, a UE that receives at least one uplink grant for at least one TTI of a multiple-TTI uplink transmission in a shared radio frequency spectrum band may be triggered to transmit a SRS without a PUSCH transmission during a TTI, by disabling all of the transport blocks (TBs) within the TTI.

Figure 3C:
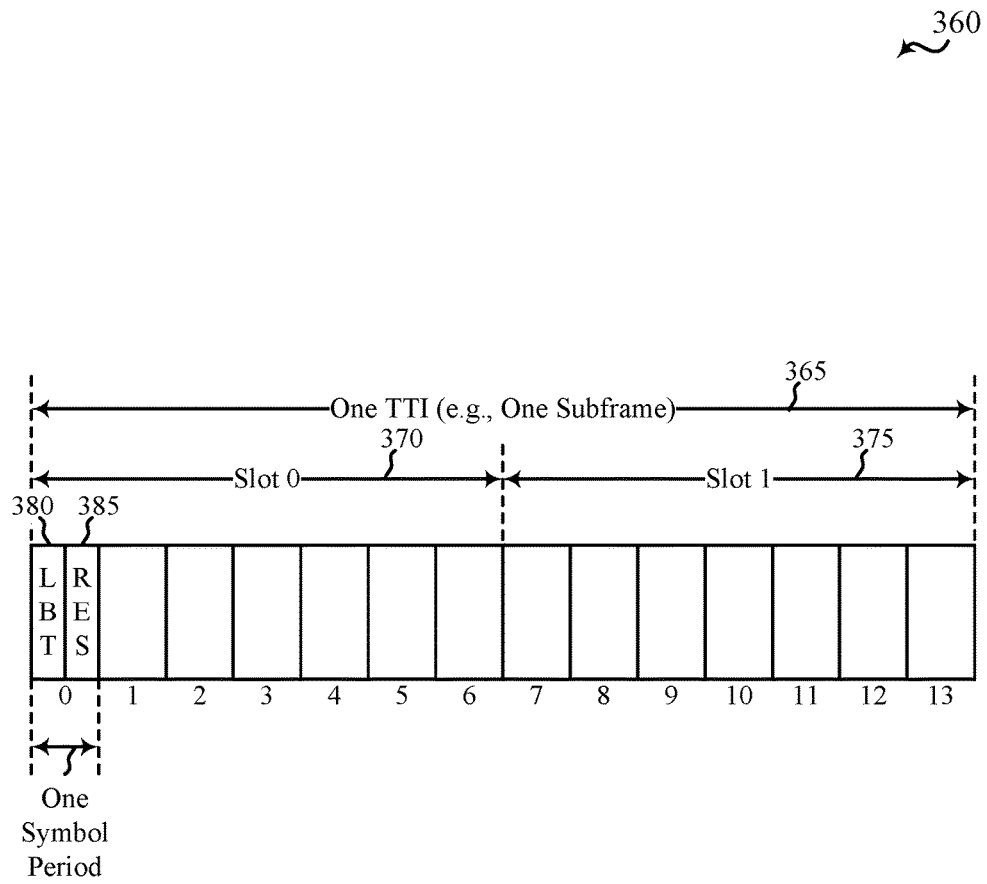

FIG. 3C shows a timeline 360 of communications in an uplink of a shared radio frequency spectrum band, and the performance of a LBT procedure 380, followed by a transmission of a channel reservation signal 385, in accordance with various aspects of the present disclosure. The timeline 360 shows one TTI 365 (e.g., one uplink (U) subframe) of an uplink transmission period (e.g., one TTI of the uplink transmission period 315 described with reference to FIG. 3A or the first uplink transmission period 335 or second uplink transmission period 350 described with reference to FIG. 3B). The TTI 365 includes a plurality of symbol periods (e.g., 14 symbol periods numbered 0-13) spanning two slots (e.g., a Slot 0 370 and a Slot 1 375).

A UE may perform a LBT procedure 380 for the TTI 365. In some examples, the LBT procedure 380 may be performed during a temporally first symbol period (e.g., Symbol Period 0) of the TTI 365. In some examples (not shown), the LBT procedure 380 may be synced to an end of the first symbol period, and upon winning contention for access to the shared radio frequency spectrum band, the UE may immediately begin an uplink transmission (e.g., a PUSCH transmission, a PUCCH transmission, a PRACH transmission, a SRS transmission, or a transmission including a combination of uplink signals) in a temporally second symbol period (e.g., Symbol Period 1) of the TTI 365. In other examples (shown), the LBT procedure 380 may be synced to a beginning of the first symbol period and performed during a first portion of the first symbol period), and upon winning contention for access to the shared radio frequency spectrum band, the UE may transmit a channel reservation signal (RES 385) during a second portion of the first symbol period. The channel reservation signal may be transmitted to reserve the shared radio frequency spectrum band between a time contention for access to the shared radio frequency spectrum band is won and a time an uplink transmission is scheduled to begin.

In some examples, the UE may select one of a plurality of different channel reservation signals to transmit during the second portion of the first symbol period (e.g., as RES 385). When the UE is scheduled to transmit a SRS before a PUSCH during the TTI 365, the selected channel reservation signal may include a SRS waveform. When the UE is scheduled to transmit a PUSCH but not a SRS during the TTI 365, and when a SRS interface is active during the first symbol period of the TTI, the selected channel reservation signal may include a SRS waveform. When a network access device that transmits an uplink grant for the TTI 365 does not indicate a selection methodology for selecting the channel reservation signal, the selected channel reservation signal may include a Wi-Fi channel reservation signal (e.g., a clear to send to self (CTS2S)). Alternatively, when the network access device that transmits the uplink grant for the TTI 365 does not indicate a selection methodology for selecting the channel reservation signal, the UE may select any form a channel reservation signal.

Figure 4:
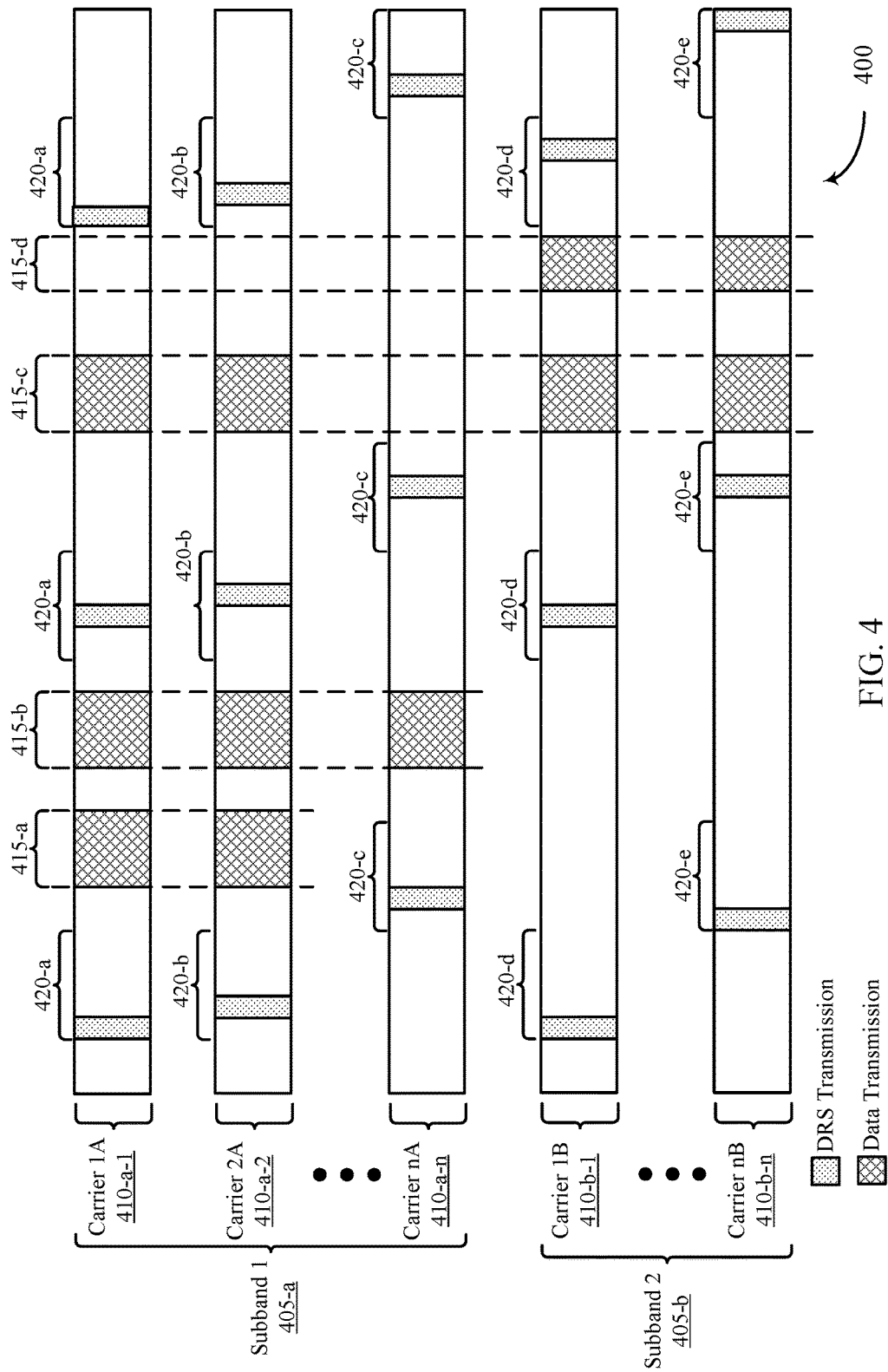
FIG. 4 shows exemplary use of a radio frequency spectrum band by a transmitter, over time, in accordance with various aspects of the present disclosure.

FIG. 4 shows a timing diagram 400 of communications over a radio frequency spectrum band, in accordance with various aspects of the present disclosure. The radio frequency spectrum band may include a number of subbands (e.g., a first subband (Subband 1 405-*a*) and a second subband (Subband 2 405-*b*)), with each subband including a number of carriers (e.g., Subband 1 405-*a* is shown to include Carrier 1A 410-*a*, Carrier 2A 410-*b*, and Carrier nA 410-*a*-*n*, and Subband 2 405-*b* is shown to include Carrier 1B 410-*b*-1 and Carrier nB 410-*b*-*n*). The transmitter for which communications are illustrated by timing diagram 400 may be, for example, one of the base stations 105 or UEs 115 described with reference to FIG. 1 or 2.

The transmitter may transmit discovery reference signals (DRS) during DRS windows 420 (e.g., DRS window configured for a carrier 410, etc.). The DRS window 420 may be defined by a DRS window period, a DRS window interval, and a DRS window offset. For example, DRS windows 420-*a* occur at predetermined timing intervals for Carrier 1A 410-*a*-1, DRS windows 420-*b* occur at the same predetermined timing intervals for Carrier 2A 410-*a*-2, and DRS windows 420-*c* occur with the same periodicity but a different offset for Carrier nA 410-*a*-*n*. Although illustrated as having the same DRS window period across Carriers 1A, 2A, and nA, DRS windows 420 for a carrier may occur at different periodicity than DRS windows 420 for a different carrier. DRS window periods and intervals for DRS windows may be synchronous or asynchronous between subbands. For example, DRS window 420-*b* in Carrier 2A 410-*a*-2 of Subband 1 405-*a* may have the same timing intervals as DRS window 420-*d* in Carrier 1B 410-*b*-1 of Subband 2 405-*b*, but DRS window 420-*b* of Carrier 2A may occur at different times than DRS window 420-*c* of Carrier nA 410-*a*-*n*. The DRS windows 420 may define windows within which DRS transmissions are transmitted, when the channel can be reserved by the transmitter (e.g., DRS transmissions may be subject to LBT procedures). A DRS transmission may be at the beginning of a DRS window, or a DRS transmission may occur at some other point within a DRS window (e.g., when the channel is busy at the beginning of the window, etc.). In some examples, each DRS transmission may follow the format of the transmission opportunities 305, 325, and 340 described with reference to FIGS. 3A and 3B, but may include only synchronization signals, system information, and/or reference signals (e.g., CRS, CSI-RS, etc.) on the transmission resources of a downlink Tx period. The DRS transmissions may be used for network reporting measurements (e.g., radio resource management (RRM) measurements).

Timing diagram 400 shows four transmission opportunities 415-*a*, 415-*b*, 415-*c*, and 415-*d* used for data transmissions. The transmission opportunities 415-*a*, 415-*b*, 415-*c*, and 415-*d* may be configured similarly to the transmission opportunities 305, 325, and 340 described with reference to FIGS. 3A and 3B, or in other ways. Also, the transmission opportunities 415-*a*, 415-*b*, 415-*c* and 415-*d* may be adjacent in time or separated by one or more periods during which the transmitter is unable to win contention for access to the shared radio frequency spectrum band or otherwise is not transmitting data. Transmission opportunities 415-*a*, 415-*b*, 415-*c*, and 415-*d* may be synchronized to gating intervals (not shown); however, transmission opportunities 415-a, 415-b, 415-c, and 415-d may also be asynchronous in relation to gating intervals.

During each of the transmission opportunities 415-a, 415-b, 415-c, and 415-d, the transmitter may contend for access to one or more (or all) of the Carriers 410-a, 410-a-2, 410-a-n, 410-b-1, 410-b-2, and 410-b-n in the manner described with reference to FIGS. 3A, 3B, and 3C, or using another contention procedure. As shown, the transmitter may win contention for access to different carriers of the radio frequency spectrum band for different transmission opportunities. By way of example, the transmitter is shown to have won contention for access to Carrier 1A 410-a-1 and Carrier 2A 410-a-2 for transmission opportunity 415-a; to Carrier 1A 410-a-1, Carrier 2A 410-a-2, and Carrier nA 410-a-n for transmission opportunity 415-b; to Carrier 1A 410-a-1, Carrier 2A 410-a-2, Carrier 1B 410-b-1, and Carrier nB 410-b-n for transmission opportunity 415-c; and to Carrier 1B 410-b-1 and Carrier nB 410-b-n for transmission opportunity 415-d.

In some examples, the transmitter may be subject to power limitations, such as limitations on maximum RF output power or maximum power spectral density (PSD), when transmitting over the shared radio frequency spectrum band. In some examples, the power limitations may be applied per transmission opportunity (e.g., to each of the transmission opportunities 415-a, 415-b, 415-c, and 415-d). One power limitation may be a limit on the total RF output power used by the transmitter in a subband when the transmitter is operating on multiple adjacent or non-adjacent carriers within a single subband. For example, within Subband 1 405-a, a maximum total RF output power may be divided among transmissions on Carrier 1A 410-a-1 and Carrier 2A 410-a-2 during transmission opportunity 415-a. In another example, the maximum total RF output power may be divided among transmissions on Carrier 1A 410-a-1, Carrier 2A 410-a-2, and Carrier nA 410-a-n during transmission opportunity 415-b. In a further example, a maximum total RF output power may be divided among transmission on Carrier 1B 410-b-1 and Carrier nB 410-b-n during transmission opportunity 415-d. Another power limitation may be a limit on the total RF output power used by the transmitter per subband when the transmitter is operating on multiple non-adjacent carriers across multiple subbands. For example, within Subband 1 405-a, a first maximum total RF output power may be divided among transmissions on Carrier 1A 410-a-1, Carrier 2A 410-a-2, and Carrier nA 410-a-n during transmission opportunity 415-b, because a parallel transmission is not being made in Subband 2 405-b during transmission opportunity 415-b. A second maximum total RF output power (lower than the first maximum total RF output power) may be divided among transmissions on Carrier 1A 410-a-1 and Carrier 2A 410-a-2 during transmission opportunity 415-c because parallel transmissions are being made in Subband 2 405-b during transmission opportunity 415-c. In this example, the second maximum total RF output power may be lower than the first maximum total RF output power to account for a potentially greater total RF output power across multiple subbands). The following table (Table 1) provides exemplary power limitations in terms of effective isotropic radiated power (EIRP), assuming that Subband 1 405-a spans a frequency range of 5,150-5,350 MHz and includes a first set of ten carriers, and assuming that Subband 2 405-b spans a frequency range of 5,470-5,725 MHz and includes a second set of ten carriers. The table provides exemplary power limitations for a transmitter operating with or without transmit power control (TPC).

TABLE 1

Mean EIRP limits for RF output power and PSD at highest transmit power

| Frequency Range of Subband | Mean EIRP Limit (dBm) | | Mean EIRP Density Limit (dBm/MHz) | |
|---|---|---|---|---|
| (MHz) | with TPC | without TPC | with TPC | without TPC |
| 5,150-5,350 | 23 | 20/23 (see Note 1) | 10 | 7/10 (see Note 2) |
| 5,470-5,725 | 30 (see Note 3) | 27 (see Note 3) | 17 (see Note 3) | 14 (see Note 3) |

Note 1:
The applicable limit may be 20 dBm, except for transmissions having nominal bandwidths that fall completely within the 5,150-5,250 MHz subband, in which case the applicable limit is 23 dBm.
Note 2:
The applicable limit may be 7 dBm/MHz, except for transmissions having nominal bandwidths that fall completely within the 5,150-5,250 MHz subband, in which case the applicable limit is 10 dBm/MHz.
Note 3:
Slave devices without a Radar Interference Detection function may comply with the limits for the 5,150-5,350 MHz band.

In some cases, a transmitter (e.g., the transmitter using the shared radio frequency spectrum band in accordance with the utilization shown in FIG. 4) may want to transmit at a maximum allowed RF output power and PSD (e.g., for better system coverage and throughput). Because transmission may be contention-based, the transmitter may win contention for access to a greater number of carriers during some transmission opportunities, and to a lower number of carriers during other transmission opportunities. Due to a total power limitation per subband, a maximum allowed RF output power may be shared among all carriers within the subband to which the transmitter wins contention for access. This implies that if the transmitter wants to transmit at the maximum allowed RF output power and PSD, the transmit PSD will be lower during transmission opportunities for which the transmitter wins contention for access to a greater number of carriers within the subband, while the transmit PSD will be higher during transmission opportunities for which the transmitter wins contention for access to a lower number of carriers within the same subband. Prior to receiving a transmission, a receiver may be unaware of the number of carriers on which the transmitter is transmitting. The receiver may also be unaware of the PSD for the transmission.

Receiving a transmission with an unknown PSD can complicate aspects of reception such as measurement and demodulation. For example, in the case of network reporting measurements (e.g., measurements based on DRS), PSD variation in the signal being measured, from one instance to another, makes it difficult to average measurements taken over multiple instances of the signal. In the case of CRS based demodulation (except for CRS based demodulation of a single layer quadrature phase-shift keying (QPSK) transmission), demodulation may be based on a TPR. The TPR may, in turn, be based on a UE-specific power offset parameter ($P_A$) and a cell-specific power offset parameter ($P_B$). A transmitter may indicate the $P_A$ and $P_B$ parameters to a receiver on a static or semi-static basis, using RRC signaling. However, variances in PSD between RRC signaling instances can result in TPR mismatch (i.e., the indicated TPR may not reflect the actual PSD in a particular transmission opportunity), which TPR mismatch can result in performance loss, for example, in 16 quadrature amplitude modulation (16QAM), 64QAM, 256QAM, and multi-layer transmissions.

To mitigate measurement, demodulation, or other challenges resulting, at least in part, from an unknown or varying PSD, one or more reference signals may be associated with preconfigured transmit power levels. For example, a transmit power level may remain fixed from one transmission opportunity to another, regardless of the number of carriers on which a transmitter transmits during a transmission opportunity. In some examples, the preconfigured transmit power levels may be based on allocating a total RF output power to one carrier, or based on allocating the total RF output power equally among all possible carriers (e.g., based on an assumption that contention for access to all of the carriers will be won).

In one embodiment, each reference signal transmitted by the transmitter may be associated with preconfigured transmit power levels. In some cases, each of the DRS and reference signals in data transmissions (e.g., CRS, CSI-RS, etc.) may be associated with a same preconfigured transmit power level. In other cases, one or more of the DRS, the data transmission CRS, and the data transmission CSI-RS may be associated with different transmit power levels (e.g., the DRS may be associated with preconfigured transmit power level A, the data transmission CRS may be associated with preconfigured transmit power level B, and the data transmission CSI-RS may be associated with preconfigured transmit power level C). Despite the transmit power levels associated with the reference signals, the traffic power associated with a carrier (e.g., Carriers 410-*a*-1, 410-*a*-2, 410-*a*-*n*, 410-*b*-1, 410-*b*-*n*, etc.) of the radio frequency spectrum band may vary from one transmission opportunity to another transmission opportunity, depending on the numbers and locations of carriers for which contention for access is won in a given transmission opportunity. Variation of the traffic power can enable better power utilization, coverage, throughput, etc.

When a data transmission CRS is transmitted with preconfigured transmit power levels, the transmitter may provide (e.g., in RRC signaling) at least one reference TPR indicator (e.g., a reference $P_A$ or reference $P_B$) referenced to the preconfigured transmit power levels of the DRS (e.g., CRS in DRS transmissions). The transmitter may also provide at least one TPR adjustment indicator (e.g., a $P_A$ adjustment indicator or a $P_B$ adjustment indicator) for each transmission opportunity. The TPR adjustment indicator for a transmission opportunity may indicate a TPR variation relative to the reference TPR, and may be signaled to a receiver in a physical frame format indicator channel (PFFICH) or grant (e.g., a UE-specific grant or common grant), on either a PCC or a SCC. The receiver may then demodulate traffic included in the transmission opportunity based at least in part on the preconfigured transmit power levels, measurement of the CRS, the at least one reference TPR indicator, and the at least one TPR adjustment indicator.

When there are many possible TPR adjustment indicators to signal to a receiver, a transmitter may operate based on a coarser set of TPR adjustment indicators (e.g., TPR adjustment indicators may be quantized in 4 sets of TPR adjustment indicators instead of 20 sets of TPR adjustment indicators). Operation based on a coarser set of TPR adjustment indicators can reduce the number of bits used to signal the set of one or more TPR adjustment indicators for a transmission opportunity (e.g., 5 bits may be needed to signal one of 20 sets of TPR adjustment indicators, but only 2 bits may be needed to signal one of 4 sets of TPR adjustment indicators).

In another embodiment, a DRS transmitted by the transmitter may be associated with preconfigured transmit power levels, and CRS and/or CSI-RS transmitted by the transmitter in data traffic transmissions may be associated with transmission-dependent transmit power levels. For example, a transmission-dependent transmit power level for reference signals may be dependent upon the number of carriers on which the transmitter transmits during a transmission opportunity. Similarly, the traffic power associated with a carrier (e.g., Carriers 410-*a*-1, 410-*a*-2, 410-*a*-*n*, 410-*b*-1, 410-*b*-2, or 410-*b*-*n*) of the radio frequency spectrum band may also vary from one transmission opportunity to another transmission opportunity, depending on the numbers and locations of carriers for which contention for access is won in a given transmission opportunity. Variation of the traffic power can enable better power utilization, coverage, throughput, etc.

When CRS or CSI-RS are transmitted with transmission-dependent transmit power levels, the transmitter may provide (e.g., in RRC signaling) at least one reference TPR indicator (e.g., a reference $P_A$ or reference $P_B$) referenced to a fixed transmit power (e.g., transmit power level for DRS), but may or may not signal the transmission-dependent transmit power levels of the CRS or CSI-RS. In such an embodiment, network reporting (e.g., RRM) measurements by a receiver (including intra and inter-frequency measurements) may be restricted to measurements of the DRS. However, when the transmission-dependent transmit power levels of the CRS or CSI-RS is signaled, or when the receiver is able to blindly detect the transmission-dependent transmit power levels of the CRS or CSI-RS, CRS and CSI-RS measurements may be used for channel estimation (e.g., filtered across different transmission opportunities), and channel feedback measurements pertaining to the receiver's serving cell may be based on a combination of DRS measurements, CRS measurements, and/or CSI-RS measurements. CRS measurements and/or CSI-RS measurements based on blind detection of a variable transmit power for a CRS or CSI-RS transmitted by a neighboring cell may be used for interference cancellation (IC) or cell selection. Additionally, determining the transmit power levels of a CRS or CSI-RS may allow a UE to provide more accurate channel state feedback and to more efficiently demodulate received traffic.

To facilitate blind detection of transmission-dependent transmit power levels used for transmission of a CRS or a CSI-RS, a transmitter may quantize the transmission-dependent transmit power levels to one of a relatively small set of values. Alternatively, a transmitter may limit the allowable range of the transmission-dependent transmit power levels (e.g., by raising the minimum value of the allowable range and/or lowering the maximum value of the allowable range) or select transmission-dependent transmit power levels within one of a plurality of discrete ranges of transmit power levels (e.g., within one of a number of ranges having enough separation to be easily detectable by a receiver).

When receiving channel feedback from a receiver in any of the preceding embodiments, a transmitter may adjust the modulation and coding scheme (MCS) used for transmission based on the channel feedback reporting and traffic power used for the data portion of the transmission. For example, channel feedback reporting may be based on normalized channel quality measurements and the transmitter may adjust the MCS based on the normalized channel quality feedback and traffic power. In one example, the normalized channel quality is relative to the traffic power used for transmissions in one carrier, and transmissions across multiple carriers have traffic power scaled by number of carriers.

Figure 5:
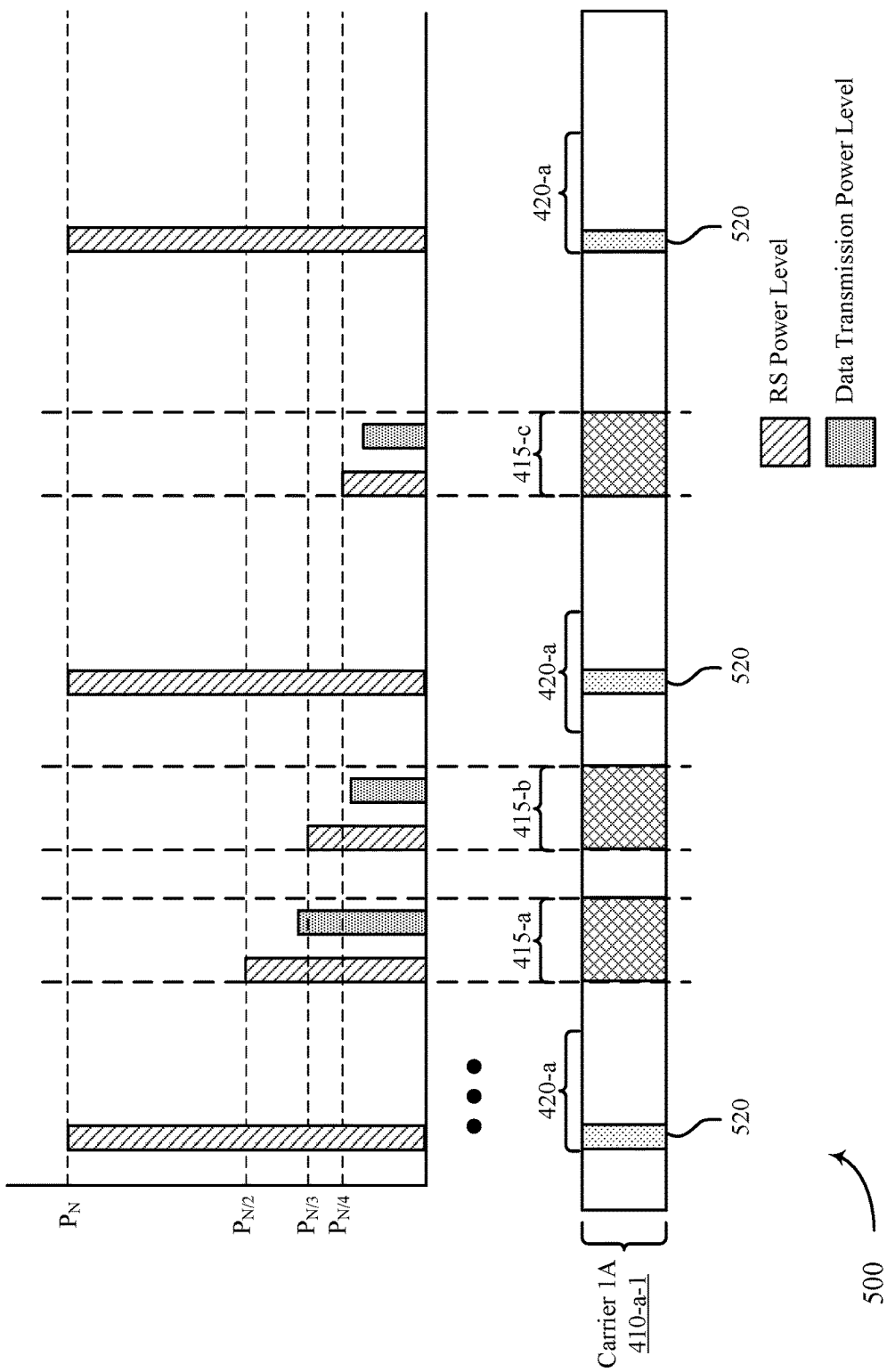
FIGS. 5-7 show block diagrams of a wireless device that supports transmitting on multiple carriers of a shared radio frequency spectrum band, in accordance with various aspects of the present disclosure.

FIG. 5 shows a transmit power level diagram 500 for a carrier of a shared radio frequency spectrum band, in accordance with various aspects of the present disclosure. Diagram 500 may be an example of transmitting reference signals with preconfigured and/or transmission-dependent transmit power levels described with reference to FIGS. 1-4.

Transmit power level diagram 500 illustrates transmit power for signals over one carrier (e.g., Carrier 1A 410-a-1) of several carriers (e.g., in subbands 405-a and 405-b of FIG. 4) configured for use by a transmitter (e.g., base station). Carrier 1A 410-a-1 may be a carrier of a shared radio frequency spectrum band and the transmitter may contend for access to Carrier 1A 410-a-1 in the manner described with reference to FIGS. 3A, 3B, and 3C, or using another contention procedure. By way of example, the transmitter is shown to have won contention for access to Carrier 1A 410-a-1 for transmission opportunities 415-a, 415-b, and 415-c as illustrated in FIG. 4.

The transmitter may transmit DRS 520 during DRS windows 420-a, where the DRS windows 420-a occur at predetermined timing intervals. The DRS 520 may be transmitted with a preconfigured transmit power level $P_N$ for Carrier 1A 410-a-1, where preconfigured transmit power levels for DRS may differ from carrier to carrier. For DRS, the preconfigured transmit power levels may be based on allocating a total RF output power to one carrier, or based on allocating the total RF output power equally among a subset (e.g., up to and including all) of the supported carriers.

The transmitter may also transmit reference signals within transmission opportunities that may have transmission-dependent transmit power levels. For example, the transmitter may transmit reference signals with transmission-dependent transmit power levels in transmission opportunities 415-a, 415-b, and 415-c. Data may also be transmitted during transmission opportunities 415-a, 415-b, and 415-c at traffic power levels that depend on the reference signal power and respective TPR values. The transmit power levels for the reference signals transmitted in transmission opportunities may vary according to the number of carriers that the transmitter has won access to transmit on via a listen-before-talk procedure.

A receiver may determine the transmission-dependent power levels of the reference signals by detecting the power levels or by receiving an indication from the transmitter of the power levels. In the case of detecting the power levels, the receiver may receive reference signals during a transmission opportunity. The receiver may then detect the transmit power level of the reference signals based on the received power level of the reference signals relative to the received power levels for a known transmit power level (e.g., the DRS). Depending upon the detected power for the reference signals, the receiver may then be able to determine the number of carriers that the transmitter is transmitting on during a transmission opportunity. For example, the reference signal power level in transmission opportunity 415-a may be detected as approximately half of the preconfigured transmit power level of a reference signal transmitted during the DRS transmissions for the carrier (e.g., $P_{N/2}$). The receiver may then determine that the there are two carriers that the transmitter is transmitting on for transmission opportunity 415-a. In another example, the reference signal power level in transmission opportunity 415-b may be detected as approximately a third of the preconfigured transmit power level of a reference signal transmitted during the DRS for the carrier (e.g., $P_{N/3}$). The receiver may then determine that there are three carriers that the transmitter is transmitting on for transmission opportunity 415-b. In yet a further example, the reference signal power level in transmission opportunity 415-c may be detected as approximately a fourth of the preconfigured transmit power level of a reference signal transmitted during the DRS for the carrier (e.g., $P_{N/4}$). The receiver may then determine that there are four carriers that the transmitter is transmitting on for transmission opportunity 415-c. The receiver may use the detected transmit power level in determining channel feedback (e.g., by scaling or normalizing the received power level for feedback reporting). The receiver may also identify the transmit power level of the data traffic of the transmission (e.g., based on the identified transmit power and TPR) and use the data traffic transmit power level in decoding. Because actual received power may vary due to varying channel conditions, the receiver may apply thresholds in determining the number of carriers used by the transmitter in a particular transmission opportunity. For example transmission over two carriers may be detected when the received power for reference signals during transmission opportunity 415-a is greater than a first threshold and less than a second threshold, where the first and second thresholds may be determined from the received power level (e.g., averaged, etc.) of the DRS.

Alternatively, the receiver may receive an indication from the transmitter of the transmit power level for reference signals transmitted in transmission opportunities. The receiver may be able to more efficiently demodulate traffic and/or provide more accurate channel feedback to the transmitter based on determining the transmission-dependent power levels of the reference signals.

Figure 6:
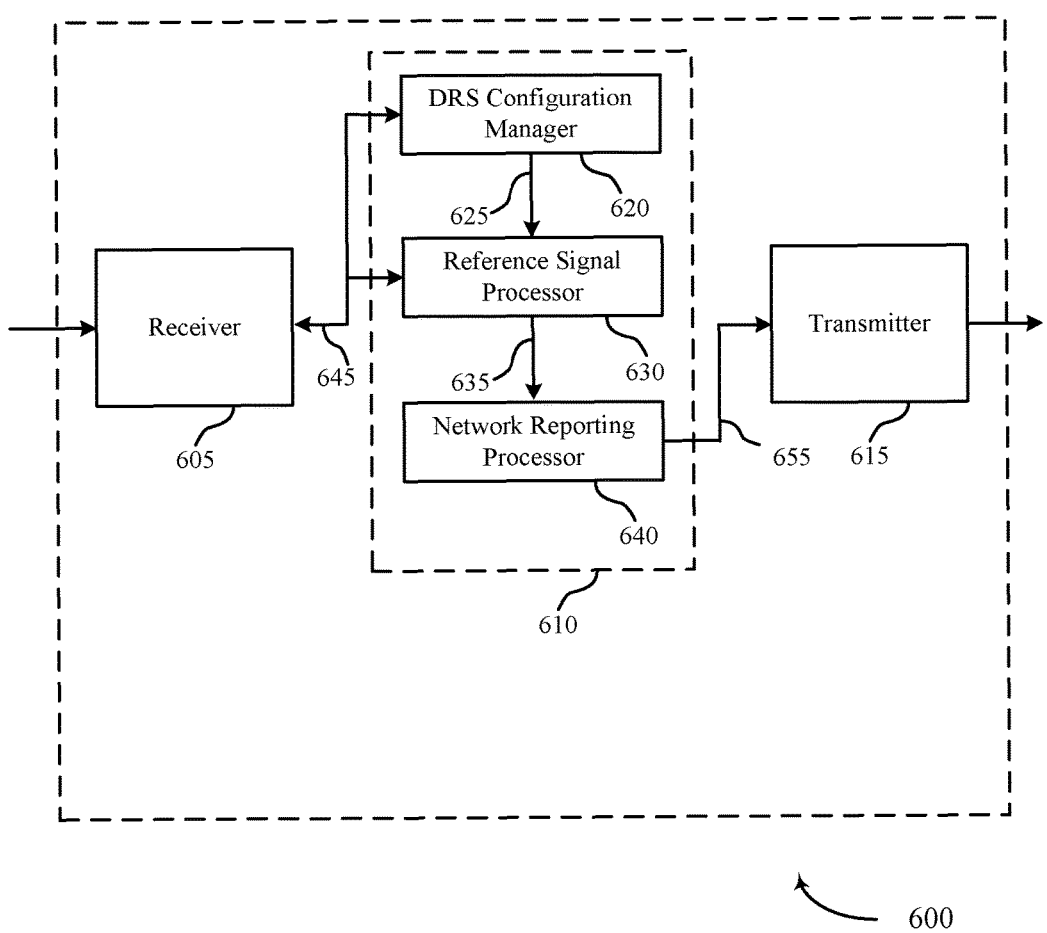

FIG. 6 shows a block diagram of a wireless device 600 for communication via multiple carriers of a shared radio frequency spectrum band, in accordance with various aspects of the present disclosure. Wireless device 600 may be an example of aspects of a UE 115 described with reference to FIGS. 1-5. Wireless device 600 may include a receiver 605, a receive power controller 610, and a transmitter 615. The receive power controller 610 may include a DRX configuration manager 620, a reference signal processor 630, and a network reporting manager 640. Wireless device 600 may also include a processor. Each of these components may be in communication with each other.

The receiver 605 may receive signals via multiple carriers and generate information 645 such as packets, user data, or control information associated with the multiple carriers. Information 645 may be passed on to the receive power controller 610, and to other components of wireless device 600. In some examples, the receiver 605 may receive, from the serving eNB, an indicator of the transmitted power levels of the reference signals. Additionally or alternatively, the receiver 605 may receive, from the serving eNB, one or more reference signals over a plurality of carriers of a shared frequency spectrum.

DRS configuration manager 620 may process information 645 related to DRS configurations for the multiple carriers and may control receiver 605 to monitor the multiple carriers for reference signals (e.g., CRS, CSI-RS, etc.) according to the DRS configurations. The DRS configuration manager 620 may also pass DRS measurement configuration 625 to reference signal processor 630. The DRS measurement configuration 625 may include the DRS windows for measurement of reference signals and preconfigured transmit power levels of the reference signals. The reference signal processor 630 may perform measurements of reference signals detected by receiver 605 on the multiple carriers in the DRS transmissions. The reference signal processor 630 may pass reference signal measurements 635 to network reporting processor 640. The network reporting processor 640 may process the reference signal measurements 635 to generate channel feedback messages 655 which may then be passed to transmitter 615 for transmission to a serving eNB. For example, the network reporting processor 640 may filter the reference signal measurements 635 based on the reference signals in the DRS transmissions for each carrier being transmitted at a preconfigured transmit power level.

The transmitter 615 may transmit channel feedback messages 655 and/or other information received from other components of wireless device 600. In some examples, the transmitter 615 may be collocated with the receiver 605 in a transceiver manager. The transmitter 615 may include a single antenna, or it may include a plurality of antennas.

Figure 7:
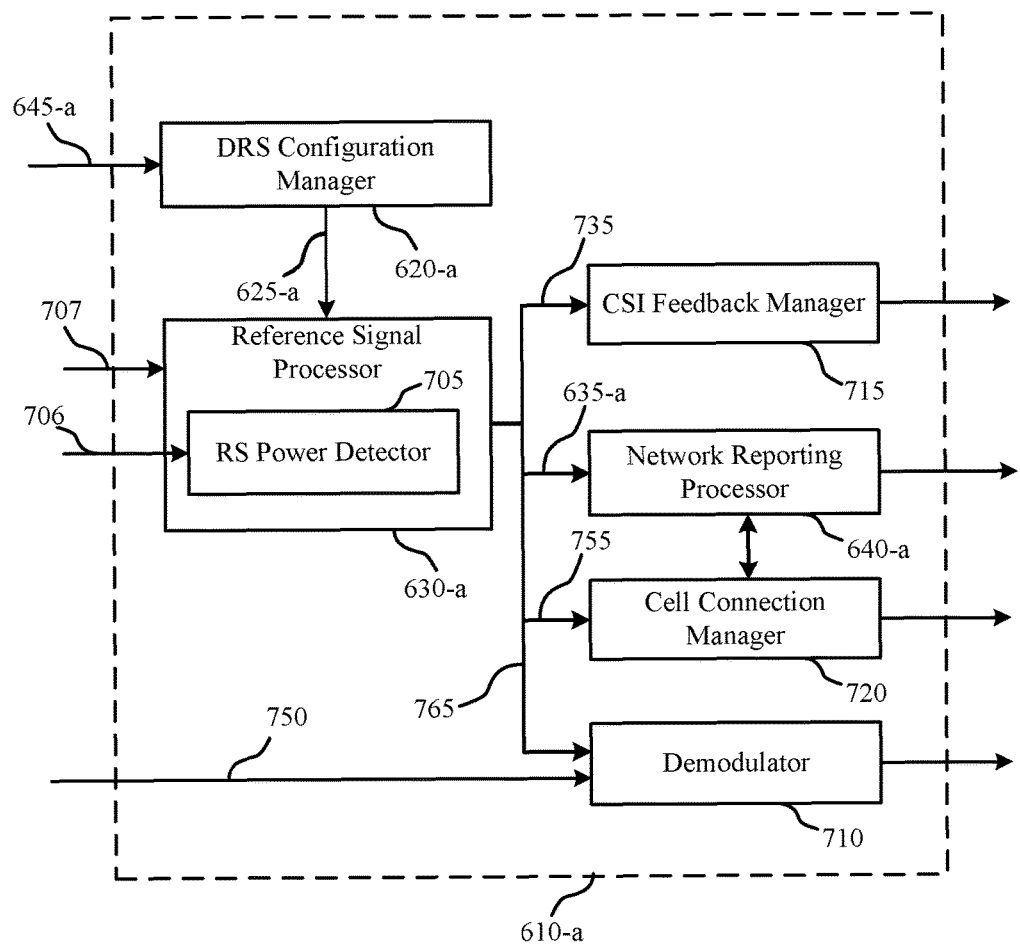

FIG. 7 shows a block diagram 700 of a receive power controller 610-a which may be a component of a wireless device for communication via multiple carriers of a shared radio frequency spectrum band, in accordance with various aspects of the present disclosure. The receive power controller 610-a may include a DRS configuration manager 620-a, a reference signal processor 630-a, and a network reporting manager 640-a. These modules may perform the functions described with reference to the DRS configuration manager 620, reference signal processor 630, and network reporting manager 640 of FIG. 6. The receive power controller 610-a may also include a demodulator 710, a CSI feedback manager 715, and a cell connection manager 720.

DRS configuration manager 620-a may process information 645-a related to DRS configurations for the multiple carriers. The DRS configuration manager 620-a may also pass DRS measurement configuration 625-a to reference signal processor 630-a. The DRS measurement configuration 625-a may include the DRS windows for measurement of reference signals and preconfigured transmit power levels of the reference signals.

The reference signal processor 630-a may include an RS power detector 705 that may determine power levels for reference signals in DRS and data transmissions. The reference signal processor 630-a may receive at least one reference TPR indicator 707, as described with reference to FIGS. 2-4. The at least one reference TPR indicator 707 may include a reference UE-specific power offset parameter ($P_A$) and a reference cell-specific power offset parameter ($P_B$). The at least one reference TPR indicator 707 may be received at the UE via RRC signaling. For processing of data transmissions over carriers in shared frequency spectrum, the RS power detector 705 may also receive at least one TPR adjustment indicator 706, which may be a single value for each of the carriers in a band, or individual values for respective carriers of a band. The at least one TPR adjustment indicator 706 may be received via at least one of a PFFICH or a grant (e.g., a UE-specific grant or a common grant). When reference signals (e.g., CRS, CSI-RS) are transmitted in a data transmission (e.g., at transmit power levels that may be transmission dependent based on a number of reserved carriers), the RS power detector 705 may detect respective second transmit power levels for the carriers of the transmission based on measuring the reference signals in the transmission. Alternatively, the RS power detector 705 may receive at least one indicator of the respective transmit power levels for the carriers of the transmission.

In some examples, the demodulator 710 may demodulate data symbols 750 of the transmission based at least in part on the indicated or detected transmit power levels 765 of the reference signals in the transmission, measured power levels of the reference signals, and the at least one TPR indicator, as described with reference to FIGS. 1-5.

The reference signal processor 630-a may determine the transmit power levels for reference signals in data transmissions and pass detected RS power levels 735 to the CSI feedback manager 715. The CSI feedback manager 715 may determine channel feedback based on the detected RS power levels. For example, the CSI feedback manager 715 may combine detected RS power levels across different transmissions (e.g., multiple different transmissions having different numbers of transmitted carriers) by comparing the detected RS power levels to the identified transmit power levels for the reference signals. The measured CSI may be combined across transmissions by, for example, normalizing to the transmit power used for one carrier. The CSI feedback manager 715 may transmit CSI feedback messages to a base station, as described with reference to FIGS. 1-5.

The cell connection manager 720 may receive DRS measurements 755 from the reference signal processor 630-a, which may include measurements of reference signals in multiple DRS transmissions. The cell connection manager 720 may select a base station as a serving cell based on the measurements, as described with reference to FIGS. 1-5.

The reference signal processor 630-a may pass reference signal measurements 635-a to network reporting processor 640-a. The network reporting processor 640-a may process the reference signal measurements 635-a to generate channel feedback messages which may then be passed to transmitter 615 for transmission to a serving eNB. For example, the network reporting processor 640-a may filter the reference signal measurements 635-a based on the reference signals in the DRS transmissions for each carrier being transmitted at a preconfigured transmit power level.

Figure 8:
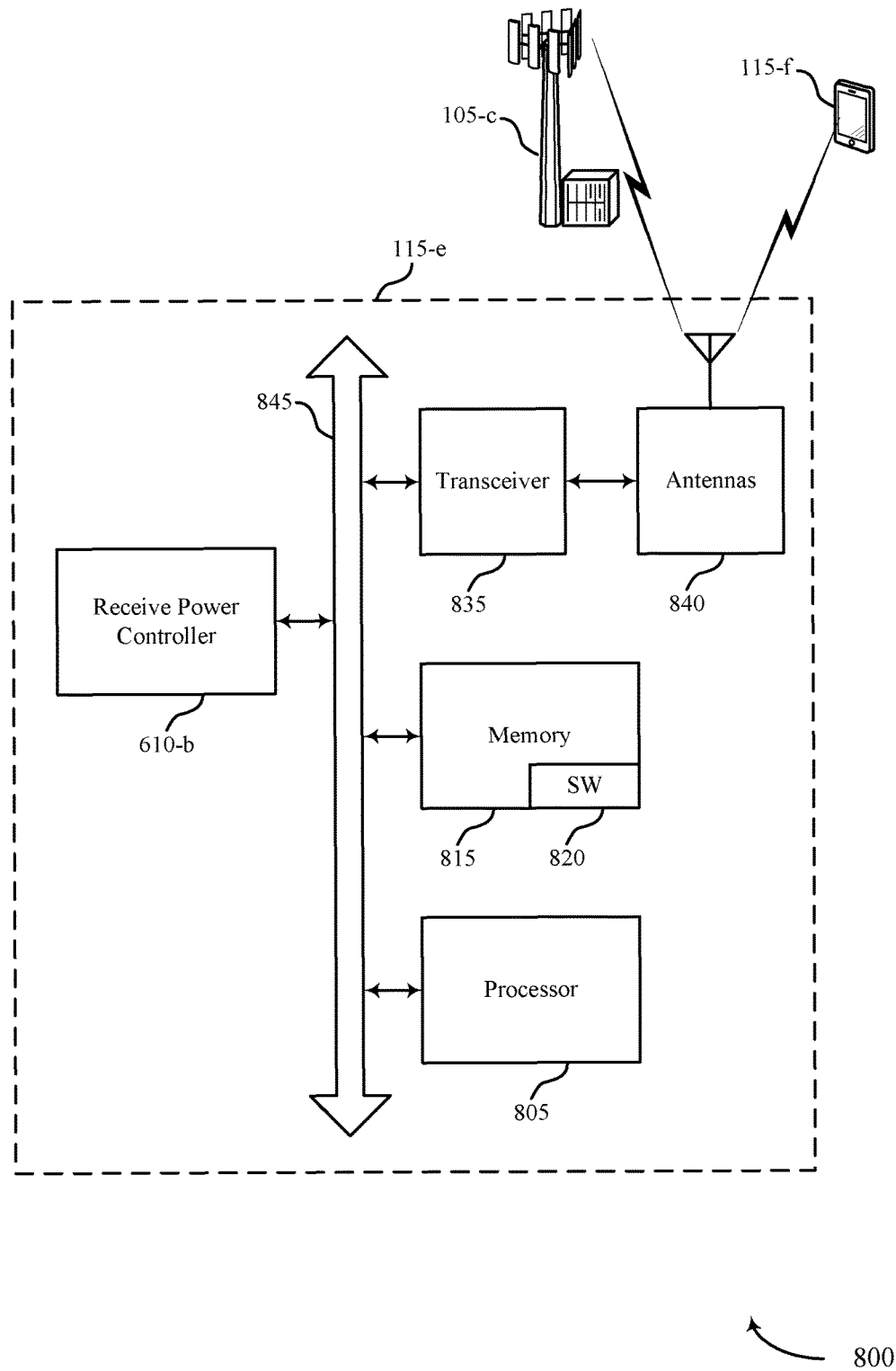
FIG. 8 illustrates a block diagram of a system including a user equipment (UE) that supports transmitting on multiple carriers of a shared radio frequency spectrum band, in accordance with various aspects of the present disclosure.

FIG. 8 shows a diagram of a system 800 including a UE 115-e configured for transmitting on multiple carriers of a shared radio frequency spectrum band in accordance with various aspects of the present disclosure. System 800 may include UE 115-e, which may be an example of a wireless device 600, or a UE 115 described with reference to FIGS. 1, 2, and 5-7. UE 115-e may include a receive power controller 610-b, which may be an example of receive power controllers 610 described with reference to FIGS. 6 and 7. UE 115-e may also include components for bi-directional voice and data communications including components for transmitting communications and components for receiving communications. For example, UE 115-e may communicate bi-directionally with base station 105-c or UE 115-f.

UE 115-e may also include a processor 805, and memory 815 (including software (SW)) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-e may include a single antenna 840, UE 115-e may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., transmitting on multiple carriers of a shared radio frequency spectrum band, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

The components of wireless devices 600 or UE 115-e, including receive power controllers 610, may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 9:
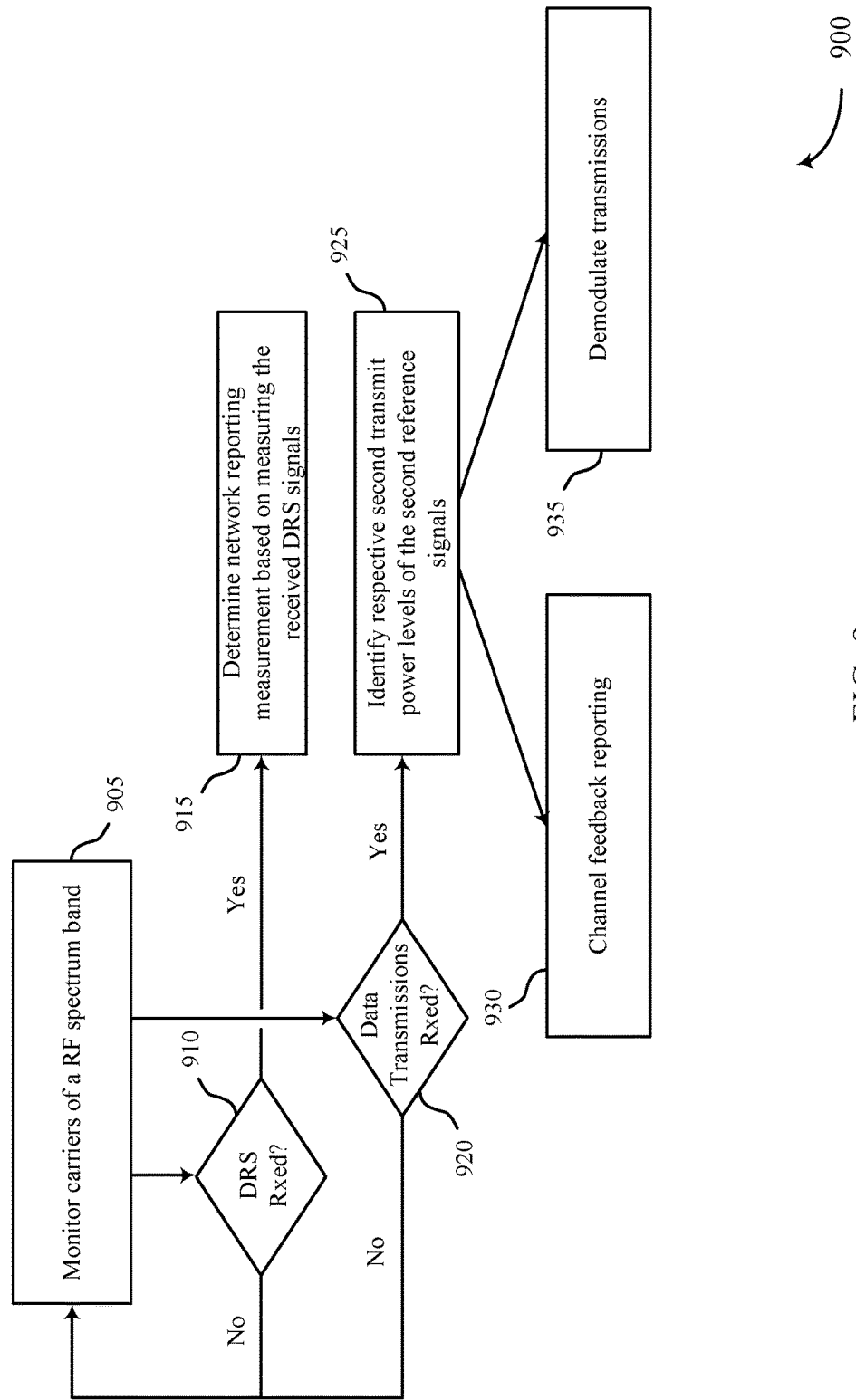
FIG. 9 shows a flowchart illustrating a method for processing signals transmitted on multiple carriers of a shared radio frequency spectrum band, in accordance with various aspects of the present disclosure.

FIG. 9 shows a flowchart illustrating a method 900 for processing signals transmitted on multiple carriers of a shared radio frequency spectrum band, in accordance with various aspects of the present disclosure. The operations of method 900 may be implemented by a UE 115 or its components, as described with reference to FIGS. 1-8. For example, the operations of method 900 may be performed by the receive power controller 610 described with reference to FIGS. 6-8. In some examples, a UE 115 may execute a set of codes to control the functional elements of the UE 115 to perform the functions described below. Additionally or alternatively, the UE 115 may perform the functions described below using special-purpose hardware.

At block 905, the UE 115 may monitor a plurality of carriers of an RF spectrum band (e.g., configured for the UE 115 in a CA mode), where transmissions over the plurality of carriers are subject to an LBT procedure. The transmissions may be received at the UE in different sets of the plurality of carriers of the RF spectrum band at different times, as described with reference to FIG. 4. In certain examples, the operations of block 905 may be performed by the receiver 605 described with reference to FIG. 6.

At block 910, the UE 115 may determine if first reference signals are received over one or more of the plurality of carriers according to a DRS configuration, where the first reference signals are associated with respective first transmit power levels, as described with reference to FIG. 4. In certain examples, the operations of block 910 may be performed by the receive power controller 610 described with reference to FIG. 6. If the first reference signals are not received, UE 115 may continue to monitor the plurality of carriers of the RF spectrum band as discussed in block 905.

At block 915, the UE 115 may determine a network reporting measurement based at least in part on measurements of the first reference signals transmitted over one or more of the plurality of carriers according to the DRS configuration, as described with reference to FIG. 4. In certain examples, the operations of block 915 may be performed by the reference signal processor 630 described with reference to FIG. 6.

At block 920, the UE 115 may determine if a transmission is received over a first set of carriers of the plurality of carriers, the transmission including second reference signals, as described with reference to FIG. 4. In certain examples, the operations of block 920 may be performed by the receiver 605 described with reference to FIG. 6. If no transmissions are received, UE 115 may continue to monitor the plurality of carriers of the RF spectrum band as discussed in block 905.

At block 925, UE 115 may identify respective second transmit power levels of the second reference signals for the first set of carriers, as described with reference to FIG. 4. The UE 115 may identify the respective second transmit power levels based on receiving an indicator indicating the respective second transmit power levels. Alternatively, the UE 115 may identify the respective second transmit power levels based on detecting a correlation of a received power level to a quantized received power level referenced to a preconfigured transmit power level in the DRS signals for the carrier (e.g., first respective transmit power levels associated with first reference signals in the DRS). In some examples, the operations of block 925 may be performed by reference signal processor 630 described with reference to FIG. 6.

At block 930, the UE 115 may demodulate the transmission at least in part on the respective second transmit power levels, measured power levels of the second reference signals, and at least one TPR indicator. In certain examples, the operations of block 930 may be performed by the demodulator 710 described with reference to FIG. 7.

At block 935, UE 115 may determine a channel feedback measurement for at least one carrier of the first set of carriers based at least in part on the identified second transmit power levels. For example, the channel feedback measurement may be determined based on scaling or normalizing the received power level according to a number of carriers used for the transmission. The scaled or normalized power levels across multiple transmissions may be used in determining the channel feedback measurement (e.g., by filtering, etc.). In certain examples, the operations of block 935 may be performed by the CSI feedback manager described with reference to FIG. 7.

Figure 10:
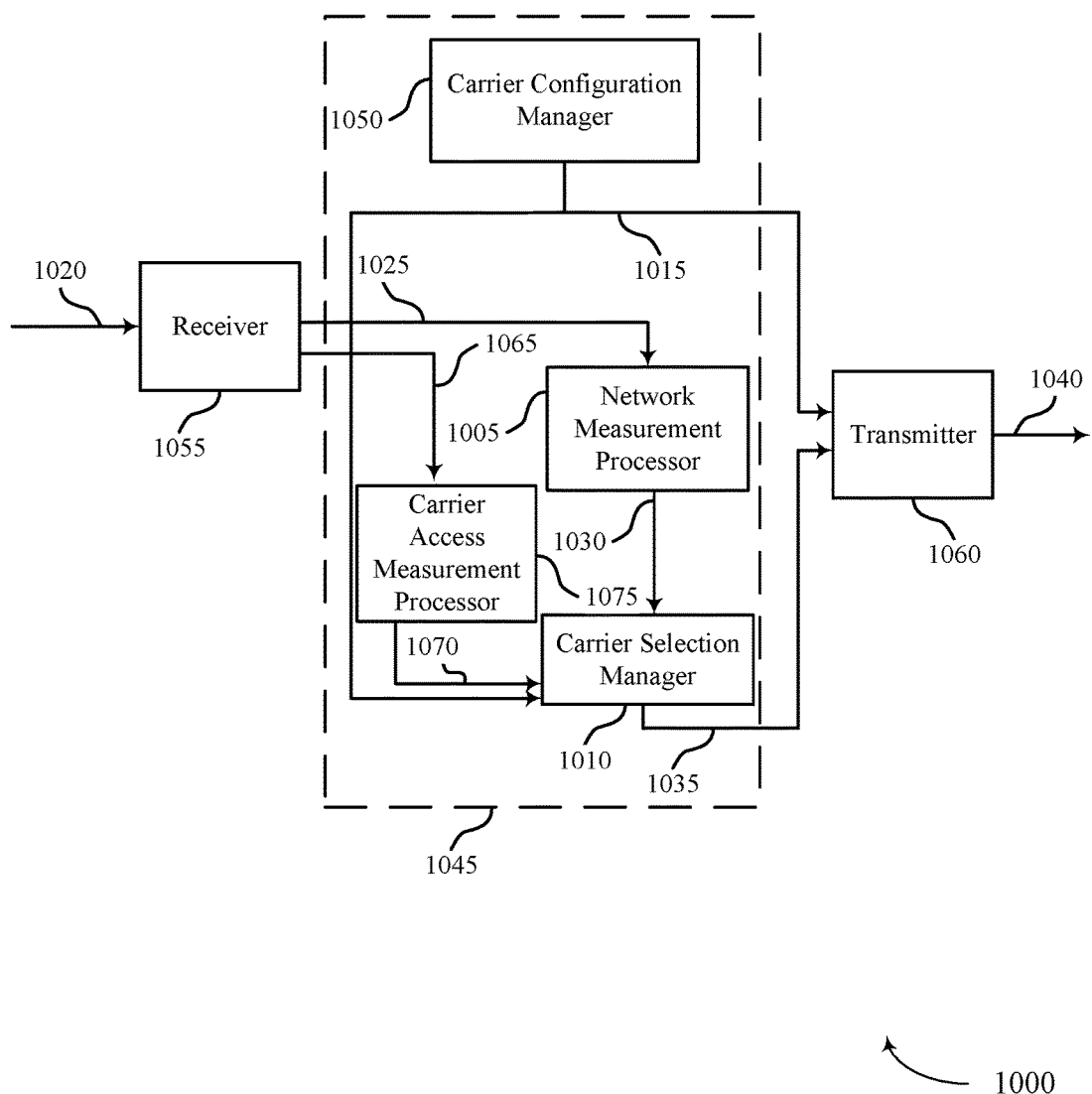
FIG. 10 shows a block diagram of a reference signal configuration manager which may be a component of a base station for transmitting over multiple carriers of a shared radio frequency spectrum band in accordance with various aspects of the present disclosure.

FIG. 10 shows a block diagram 1000 of a reference signal configuration manager 1045 which may be a component of a base station 105 for transmitting over multiple carriers of a shared radio frequency spectrum band in accordance with various aspects of the present disclosure. The reference signal configuration manager 1045 may include a carrier configuration manager 1050, a carrier selection manager 1010, and a signal measurement processor 1005.

The carrier configuration manager 1050 may determine configurations for reference signals for carriers supported by the base station 105. For example, the carrier configuration manager 1050 may determine DRS configurations for the carriers and transmit power levels for reference signals (e.g., CRS, CSI-RS) in DRS transmissions. The configuration manager 1050 may forward a configuration message 1015 to a transmitter 1060 as well as to carrier selection manager 1010. The configuration message 1015 may include the DRS configurations and/or transmit power levels for DRS transmissions and/or data transmissions over the carriers. Additionally or alternatively, the configuration message 1015 may include at least one TPR indicator. The transmitter 1060 may transmit the configuration messages 1015 to served UEs 115.

A receiver 1055 may receive signaling 1020, which may include network measurement reporting from served UEs 115. Additionally or alternatively, signaling 1020 may include a number of carriers subject to a listen-before-talk (LBT) procedure. The receiver 1055 may forward a reported network measurement 1025 to the signal measurement processor 1005. The reported network measurements 1025 may include information related to a radio resource management (RRM) measurement. The signal measurement processor 1005 may process the reported network measurements 1025 and may forward a processed measurement message 1030 to the carrier selection manager 1010. The processed measurement message 1030 may include carrier measurement information. The carrier selection manager 1010 may select a number of carriers based on the processed measurement message 1030. Additionally or alternatively, receiver 1055 may forward signaling 1065 to the carrier access measurement processor 1075. The carriers access measurement processor 1075 may forward a carrier access information message 1070 to the carrier selection manager 1010. The carrier access information message 1065 may include a number of carriers available to transmit on as a result of a listen-before-talk (LBT) procedure. The carrier selection manager may then select a set of the number of carriers that are available to transmit on, and may send a carrier selection information message 1035 to the transmitter 1060, where the carrier selection information message may include the set of the selected carriers of the number of carriers that are available to transmit on. The transmitter 1060 may then transmit transmission information 1040 to a UE 115.

Figure 11:
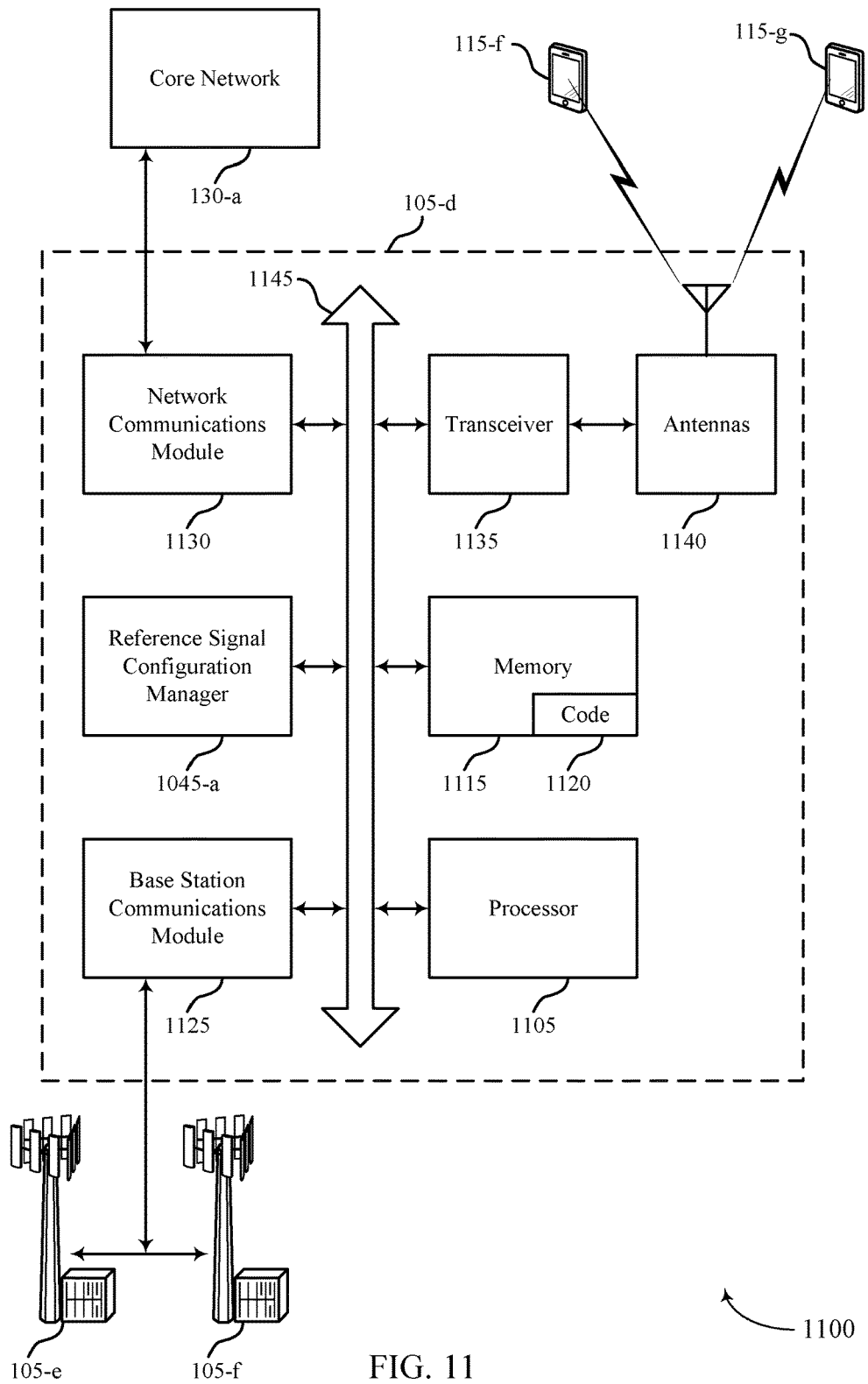
FIG. 11 shows a diagram of a system including a base station configured for transmitting on multiple carriers of a shared radio frequency spectrum band, in accordance with aspects of the present disclosure.

FIG. 11 shows a diagram of a system 1100 including a base station 105-*d* configured for transmitting on multiple carriers of a shared radio frequency spectrum band, in accordance with aspects of the present disclosure. The base station 105-*d* may be an example of a base station 105 described with reference to FIGS. 1 and 2. The base station 105-*d* may include a reference signal configuration manager 1045-*a*, which may be an example of reference signal configuration manager 1045 as described with reference to FIG. 10. The base station 105-*d* may also include components for bi-directional voice and data communications including components for transmitting communications and components for receiving communications. For example, the base station 105-*d* may communicate bi-directionally with a base station 105-*e*, a base station 105-*f*, a UE 115-*f*, and/or a UE 115-*g*.

In some cases, base station 105-*d* may have one or more wired backhaul links. Base station 105-*d* may have a wired backhaul link (e.g., S1 interface, etc.) to the core network 130-*a*. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communications manager 1125. In some examples, base station communications manager 1125 may provide an X2 interface within an LTE/LTE-A wireless communication network technology to provide communication between some of the base stations 105. In some examples, base station 105-*d* may communicate with other base stations through core network 130-*a*. In some cases, base station 105-*d* may communicate with the core network 130 through network communications manager 1130.

The base station 105-*d* may include a processor 1105, memory 1115, transceiver 1135, and antenna(s) 1140, which each may be in communication, directly or indirectly, with one another (e.g., over bus 1145). The transceivers 1135 may be configured to communicate bi-directionally, via the antenna(s) 1140, with the UEs 115, which may be multi-mode devices. The transceiver 1135 (or other components of the base station 105-*c*) may also be configured to communicate bi-directionally, via the antennas 1140, with one or more other base stations (not shown). The transceiver 1135 may include a modem configured to modulate the packets and provide the modulated packets to the antennas 1140 for transmission, and to demodulate packets received from the antennas 1140. The base station 105-*d* may include multiple transceivers 1135, each with one or more associated antennas 1140. The transceiver 1135 and antenna(s) 1140 may be an example of aspects of both a receiver 1055 and transmitter 1060 described with reference to FIG. 10 (e.g., a combined receiver 1055 and transmitter 1060, etc.).

The memory 1115 may include RAM and ROM. The memory 1115 may also store computer-readable, computer-executable software/firmware code 1320 containing instructions that are configured to, when executed by the processor 1105, cause the base station 105-*d* to perform various functions described herein (e.g., selecting coverage enhancement techniques, call processing, database management, message routing, etc.). Alternatively, the software/firmware code 1120 may not be directly executable by the processor 1105 but be configured to cause the computer, e.g., when compiled and executed, to perform functions described herein. The processor 1105 may include an intelligent hardware device, e.g., a CPU, a microcontroller, an ASIC, etc. The processor 1105 may include various special purpose processors such as encoders, queue processing managers, base band processors, radio head controllers, digital signal processors (DSPs), and the like.

The base station communications manager 1125 may manage communications with other base stations 105. The base station communications manager 1125 may include a controller or scheduler for controlling communications with UEs 115 in cooperation with other base stations 105. For example, the base station communications manager 1125 may coordinate scheduling for transmissions to UEs 115 for various interference mitigation techniques such as beamforming or joint transmission.

The reference signal configuration manager 1045-*a* may be an example of a reference signal configuration manager 1045 described with reference to FIG. 10, and may manage various aspects of transmitting reference signals over multiple carriers as described herein. The reference signal configuration manager 1045-*a* may be in communication with other components of the base station 105-*d*, directly or indirectly, over the one or more buses 1145. The reference signal configuration manager 1045-*a*, or portions of it, may include a processor, or some or all of the functions of the reference signal configuration manager 1045-*a* may be performed by the processor 1105 or in connection with the processor 1105.

Figure 12:
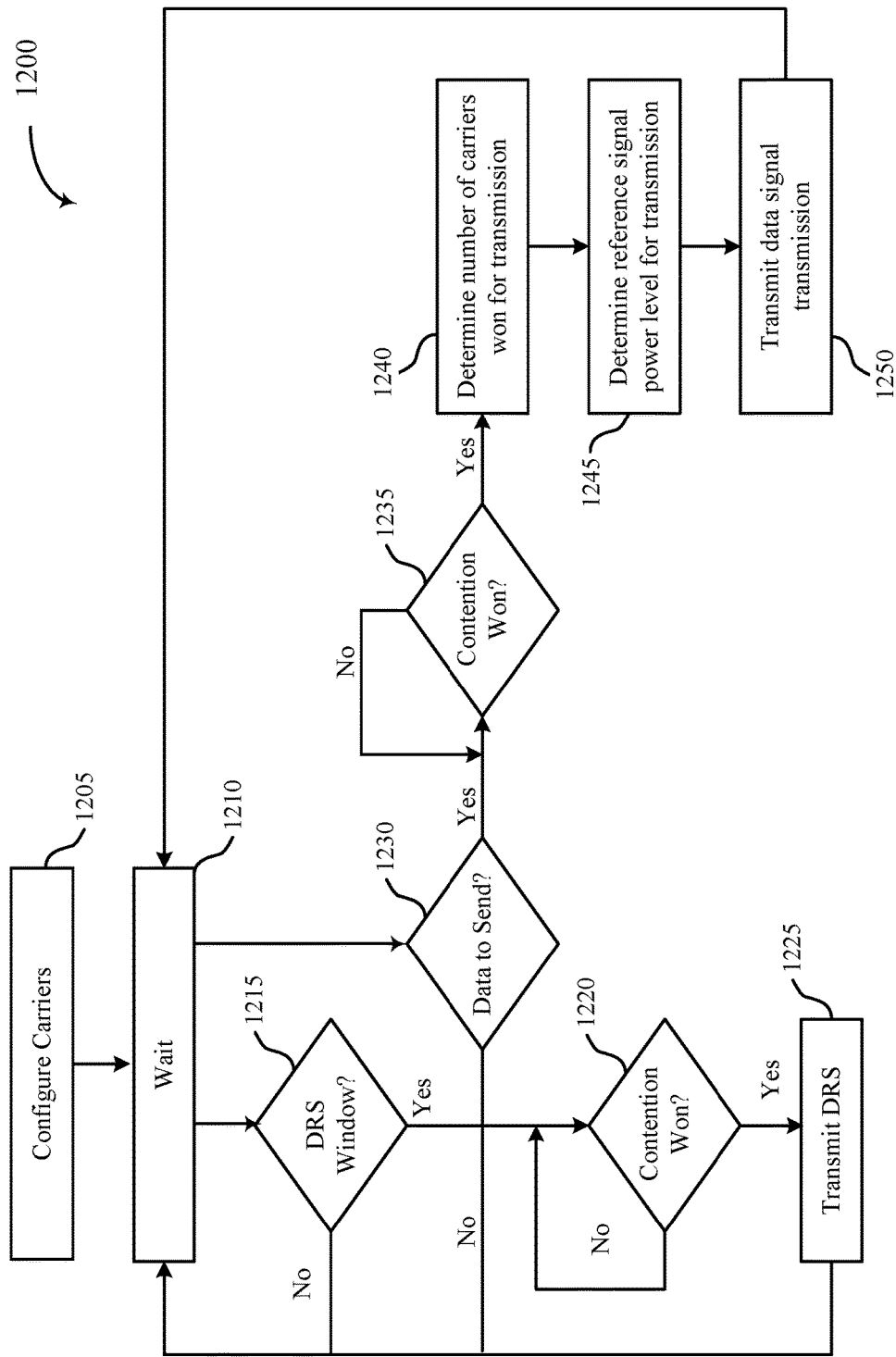
FIG. 12 shows a flowchart illustrating a method for transmitting on multiple carriers of a shared radio frequency spectrum band, in accordance with various aspects of the present disclosure.

FIG. 12 shows a flowchart illustrating a method 1200 for transmitting on multiple carriers of a shared radio frequency spectrum band, in accordance with various aspects of the present disclosure. The operations of method 1200 may be implemented by a base station 105 or its components, as described with reference to FIGS. 1-2 and 10-11. For example, the operations of method 1200 may be performed by reference signal configuration managers 1045 described with reference to FIGS. 10-11. In some examples, a base station 105 may execute a set of codes to control the functional elements of the base station 105 to perform the functions described below. Additionally or alternatively, the base station 105 may perform the functions described below using special-purpose hardware.

At block 1205, base station 105 may configure multiple carriers of a shared frequency spectrum band for communications. In some examples, the configuring of carriers may include configuring carriers for transmission of first reference signals (e.g., DRS). Additionally or alternatively, the configuring of carriers may include configuring parameters for data transmission signals that include second reference signals (e.g., CRS, CSI-RS, etc.). In other examples, the configuring of carriers may include configuring carriers for transmission of at least one TPR indicator. In some examples, the functions of block 1205 may be performed by the carrier configuration manager 1050 described in reference to FIG. 10.

At block 1210, the base station 105 may wait for a DRS window to be available for transmission of DRS, or the base station 105 may wait for data to be queued for transmission.

If a configured DRS window for one or more of the multiple carriers opens at block 1215, then the base station 105 may proceed to block 1220 to determine if the base station 105 can transmit the DRS signals in the window. At block 1220, the base station 105 may determine whether the one or more carriers are available to transmit on according (e.g., using an LBT procedure). If there are no carriers available after the LBT procedure (e.g., contention was not won for any carriers), base station 105 may then continue to contend for carriers to transmit on using the LBT procedure. If carriers are available to transmit on, then base station 105 may perform the functions discussed in block 1225.

At block 1225, the base station 105 may transmit first reference signals over a plurality of carriers according to a DRS configuration. The DRS configuration may include respective first (e.g., preconfigured) transmit power levels associated with the first reference signals.

At block 1230, the base station 105 may determine whether data is queued for transmission. If there is no data that is queued for transmission, the base station 105 may continue to wait for either a DRS window to become available or for data to be queued for transmission, as described in block 1210. If data is queued for transmission, the base station 105 may determine whether a number of carriers in shared frequency spectrum band are available to transmit on according to a LBT procedure at 1235. If there are no carriers available after the LBT procedure (e.g., contention was not won for any carriers), base station 105 may then continue to contend for carriers to transmit on using the LBT procedure. If carriers are available to transmit on, then base station 105 may determine a number of carriers that are available to transmit on (e.g., a number of carriers won in contention) at 1240. In some examples, the functions of block 1240 may be performed by the carrier access measurement processor 1070 described with reference to FIG. 10.

At block 1245, the base station 105 may determine reference signal transmit power levels for the transmission. The reference signal transmit power levels determination may be based at least in part on the number of carriers available to transmit on. In some examples, the functions of block 1245 may be performed by the carrier configuration manager 1050 described with reference to FIG. 10.

At block 1250, the base station may transmit a data signal transmission over a first set of carriers. The data signal transmission may include second reference signals (e.g., CRS, CSI-RS) transmitted at the determined reference signal transmit power levels. Additionally, the transmit power levels of the data may be based at least in part on a number of carriers in the first set of carriers.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
monitoring a plurality of carriers of a radio frequency (RF) spectrum band according to a discovery reference signals (DRS) configuration, wherein transmissions over the plurality of carriers are subject to a listen-before-talk (LBT) procedure;
determining a network reporting measurement based at least in part on measurements of first cell-specific reference signals transmitted over one or more of the plurality of carriers according to the DRS configuration, wherein the first cell-specific reference signals are transmitted at respective first transmit power levels that are preconfigured for the plurality of carriers; and
receiving a transmission over a first set of carriers of the plurality of carriers, the transmission including second cell-specific reference signals transmitted at respective second transmit power levels, wherein the respective second transmit power levels are different than the respective first transmit power levels for at least one of the first set of carriers.

2. The method of claim 1, further comprising:
receiving at least one traffic-to-pilot ratio (TPR) indicator associated with the transmission; and
demodulating the transmission based at least in part on measured power levels of the received second cell-specific reference signals, and the at least one TPR indicator.

3. The method of claim 2, further comprising:
identifying the respective second transmit power levels based at least in part on the measurements of the first cell-specific reference signals and the measured power levels of the received second cell-specific reference signals.

4. The method of claim 1, further comprising:
receiving at least one indicator of the respective second transmit power levels.

5. The method of claim 1, further comprising:
determining a channel feedback measurement for at least one carrier of the first set of carriers based at least in part on a number of transmitted carriers.

6. The method of claim 5, further comprising:
transmitting to a base station a channel state information (CSI) feedback message indicating a power spectral density measurement.

7. The method of claim 1, wherein determining the network reporting measurement is based in part on channel measurements of the second cell-specific reference signals transmitted at the respective second transmit power levels for the first set of carriers.

8. The method of claim 1, wherein the respective second transmit power levels comprise values of a set of preconfigured values relative to the respective first transmit power levels.

9. An apparatus for wireless communication, comprising:
means for monitoring a plurality of carriers of a radio frequency (RF) spectrum band according to a discovery reference signals (DRS) configuration, wherein transmissions over the plurality of carriers are subject to a listen-before-talk (LBT) procedure;
means for determining a network reporting measurement based at least in part on measurements of first cell-specific reference signals transmitted over one or more of the plurality of carriers according to the DRS configuration, wherein the first cell-specific reference signals are transmitted at respective first transmit power levels that are preconfigured for the plurality of carriers; and
means for receiving a transmission over a first set of carriers of the plurality of carriers, the transmission including second cell-specific reference signals transmitted at respective second transmit power levels, wherein the respective second transmit power levels are different than the respective first transmit power levels for at least one of the first set of carriers.

10. The apparatus of claim 9, further comprising:
means for receiving at least one traffic-to-pilot ratio (TPR) indicator associated with the transmission; and means for demodulating the transmission based at least in part measured power levels of the received second cell-specific reference signals, and the at least one TPR indicator.

11. The apparatus of claim 10, further comprising:
means for identifying the respective second transmit power levels based at least in part on the measurements of the first cell-specific reference signals and the measured power levels of the received second cell-specific reference signals.

12. The apparatus of claim 9, further comprising:
receiving at least one indicator of the respective second transmit power levels.

13. The apparatus of claim 9, further comprising:
means for determining a channel feedback measurement for at least one carrier of the first set of carriers based at least in part on a number of transmitted carriers.

14. The apparatus of claim 13, further comprising:
means for transmitting, to a base station, a channel state information (CSI) feedback message indicating a power spectral density measurement.

15. The apparatus of claim 9, wherein determining the network reporting measurement is based in part on channel measurements of the second cell-specific reference signals transmitted at the respective second power levels for the first set of carriers.

16. The apparatus of claim 9, wherein the respective second transmit power levels comprise values of a set of preconfigured values relative to the respective first transmit power levels.

17. An apparatus for wireless communication, in a system comprising:
a processor;
memory in electronic communication with the processor; and
instructions stored in the memory and operable, when executed by the processor, to cause the apparatus to:
monitor a plurality of carriers of a radio frequency (RF) spectrum band according to a discovery reference signals (DRS) configuration, wherein transmissions over the plurality of carriers are subject to a listen-before-talk (LBT) procedure;
determine a network reporting measurement based at least in part on measurements of first cell-specific reference signals transmitted over one or more of the plurality of carriers according to the DRS configuration, wherein the first cell-specific reference signals are transmitted at respective first transmit power levels that are preconfigured for the plurality of carriers; and
receive a transmission over a first set of carriers of the plurality of carriers, the transmission including second cell-specific reference signals transmitted at respective second transmit power levels, wherein the respective second transmit power levels are different than the respective first transmit power levels for at least one of the first set of carriers.

18. The apparatus of claim 17, wherein the instructions are further executable by the processor to:
receive at least one traffic-to-pilot ratio (TPR) indicator associated with the transmission; and
demodulate the transmission based at least in part on measured power levels of the received second cell-specific reference signals, and the at least one TPR indicator.

19. The apparatus of claim 18, wherein the instructions are further executable by the processor to identify the respective second transmit power levels based at least in part on the measurements of the first cell-specific reference signals and the measured power levels of the received second cell-specific reference signals.

20. The apparatus of claim 17, wherein the instructions are further executable by the processor to receive at least one indicator of the respective second transmit power levels.

21. The apparatus of claim 17, wherein the instructions are further executable by the processor to:
determine a channel feedback measurement for at least one carrier of the first set of carriers based at least in part on a number of transmitted carriers.

22. The apparatus of claim 21, wherein the instructions are further executable by the processor to:
transmit, to a base station, a channel state information (CSI) feedback message indicating a power spectral density measurement.

23. The apparatus of claim 17, wherein determining the network reporting measurement is based in part on channel measurements of the second cell-specific reference signals transmitted at the respective second transmit power levels for the first set of carriers.

24. The apparatus of claim 17, wherein the respective second transmit power levels comprise values of a set of preconfigured values relative to the respective first transmit power levels.

25. A non-transitory computer readable medium storing code for wireless communication, the code comprising instructions executable by a processor to:
monitor a plurality of carriers of a radio frequency (RF) spectrum band according to a discovery reference signals (DRS) configuration, wherein transmissions over the plurality of carriers are subject to a listen-before-talk (LBT) procedure;
determine a network reporting measurement based at least in part on measurements of first cell-specific reference signals transmitted over one or more of the plurality of carriers according to the DRS configuration, wherein the first cell-specific reference signals are transmitted at respective first transmit power levels that are preconfigured for the plurality of carriers; and
receive a transmission over a first set of carriers of the plurality of carriers, the transmission including second cell-specific reference signals transmitted at respective second transmit power levels, wherein the respective second transmit power levels are different than the respective first transmit power levels for at least one of the first set of carriers.

26. The non-transitory computer readable medium of claim 25, wherein the instructions are further executable by the processor to:
receive at least one traffic-to-pilot ratio (TPR) indicator associated with the transmission; and
demodulate the transmission based at least in part on measured power levels of the received second cell-specific reference signals, and the at least one TPR indicator.

27. The non-transitory computer readable medium of claim 26, wherein the instructions are further executable by the processor to identify the respective second transmit power levels based at least in part on the measurements of the first cell-specific reference signals and the measured power levels of the received second cell-specific reference signals.

28. The non-transitory computer readable medium of claim 25, wherein the instructions are further executable by the processor to receive at least one indicator of the respective second transmit power levels.

29. The non-transitory computer readable medium of claim 25, wherein the instructions are further executable by the processor to:
   determine a channel feedback measurement for at least one carrier of the first set of carriers based at least in part on a number of transmitted carriers.

30. The non-transitory computer readable medium of claim 29, wherein the instructions are further executable by the processor to:
   transmit, to a base station, a channel state information (CSI) feedback message indicating a power spectral density measurement.

31. The non-transitory computer readable medium of claim 25, wherein the determining the network reporting measurement is based in part on channel measurements of the second cell-specific reference signals transmitted at the respective second transmit power levels for the first set of carriers.

32. The non-transitory computer readable medium of claim 25, wherein the respective second transmit power levels comprise values of a set of preconfigured values relative to the respective first transmit power levels.

* * * * *